United States Patent [19]

Ohshita

[11] Patent Number: 5,764,425
[45] Date of Patent: Jun. 9, 1998

[54] TELEPHOTO LENS

[75] Inventor: Koichi Ohshita, Tokyo, Japan

[73] Assignee: Nikon Corporation, Tokyo, Japan

[21] Appl. No.: 662,234

[22] Filed: Jun. 14, 1996

[30] Foreign Application Priority Data

Aug. 17, 1995 [JP] Japan .................. 7-231950

[51] Int. Cl.⁶ .................. G02B 13/02; G02B 9/04
[52] U.S. Cl. .................. 359/748; 359/745; 359/795
[58] Field of Search .................. 359/748, 753, 359/754, 784, 785, 789, 794, 795, 786, 716, 717, 691, 692, 745

[56] References Cited

U.S. PATENT DOCUMENTS

| | | | |
|---|---|---|---|
| 1,467,804 | 9/1923 | Merté et al. | 359/748 |
| 1,480,929 | 1/1924 | Booth | 359/748 |
| 1,573,999 | 2/1926 | Richter | 359/748 |
| 1,897,896 | 2/1933 | Frederick et al. | 359/748 |
| 2,231,699 | 2/1941 | Bennett | 359/748 |
| 2,327,759 | 8/1943 | Bennett | 359/748 |
| 2,346,312 | 4/1944 | Kastilan | 359/748 |
| 2,390,387 | 12/1945 | Rayton et al. | 359/748 |
| 2,421,927 | 6/1947 | Cox | 359/748 |
| 2,769,371 | 11/1956 | Gilkeson | 359/748 |
| 2,810,322 | 10/1957 | Tronnier | 359/748 |
| 3,247,764 | 4/1966 | Rickless et al. | 359/748 |

FOREIGN PATENT DOCUMENTS

| | | |
|---|---|---|
| 23-2983 | 11/1923 | Japan . |
| 132067 | 9/1919 | United Kingdom . |
| 144932 | 6/1920 | United Kingdom . |
| 151507 | 9/1920 | United Kingdom . |
| 198958 | 6/1923 | United Kingdom . |
| 234091 | 8/1925 | United Kingdom . |
| 1489038 | 10/1977 | United Kingdom . |

*Primary Examiner*—Frank G. Font
*Assistant Examiner*—Michael P. Stafira
*Attorney, Agent, or Firm*—Shapiro and Shapiro

[57] ABSTRACT

A telephoto lens includes, in the following order from the object side, a positive cemented lens component composed of a biconvex lens and a biconcave lens and having a meniscus shape as a whole with the convex side facing the object side, and a negative meniscus lens component with the convex side facing the image side.

9 Claims, 22 Drawing Sheets

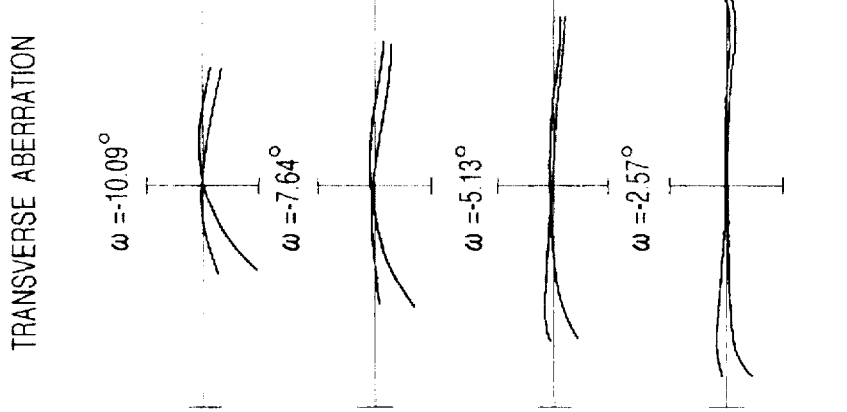
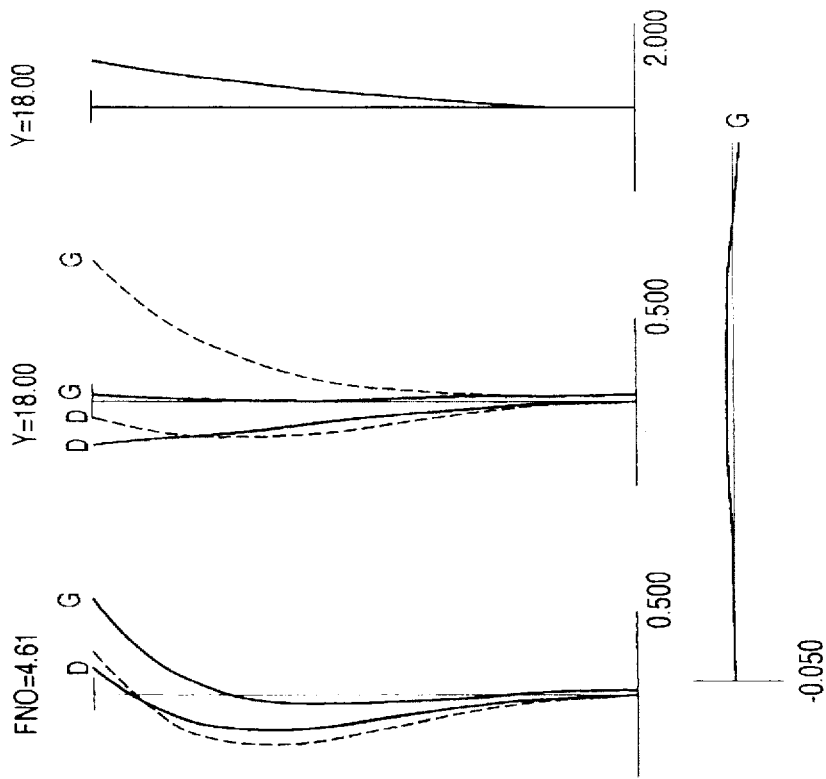

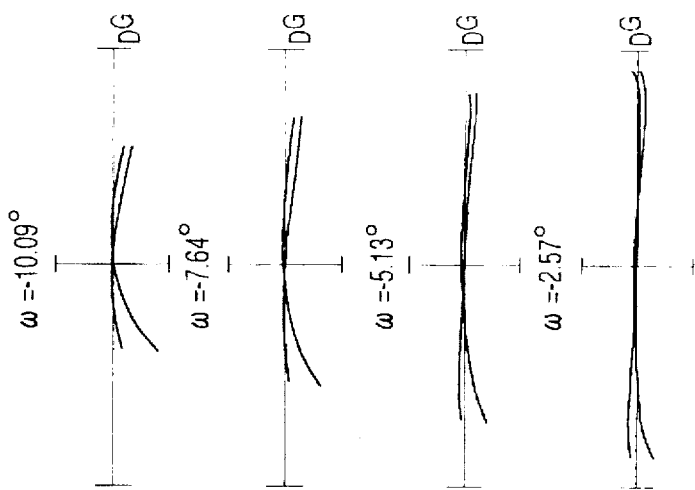
FIG. 4E
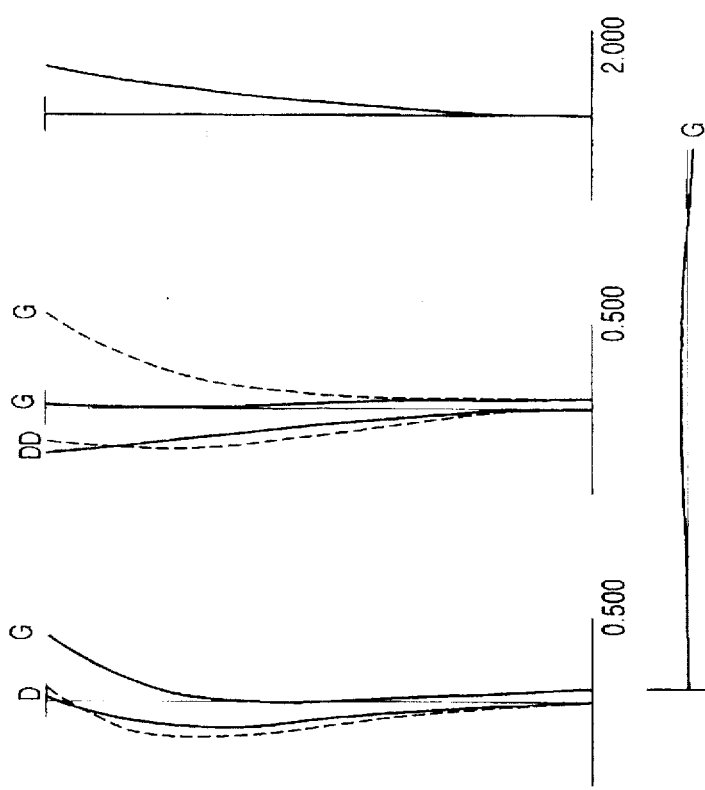
FIG. 4A  FIG. 4B  FIG. 4C
FIG. 4D

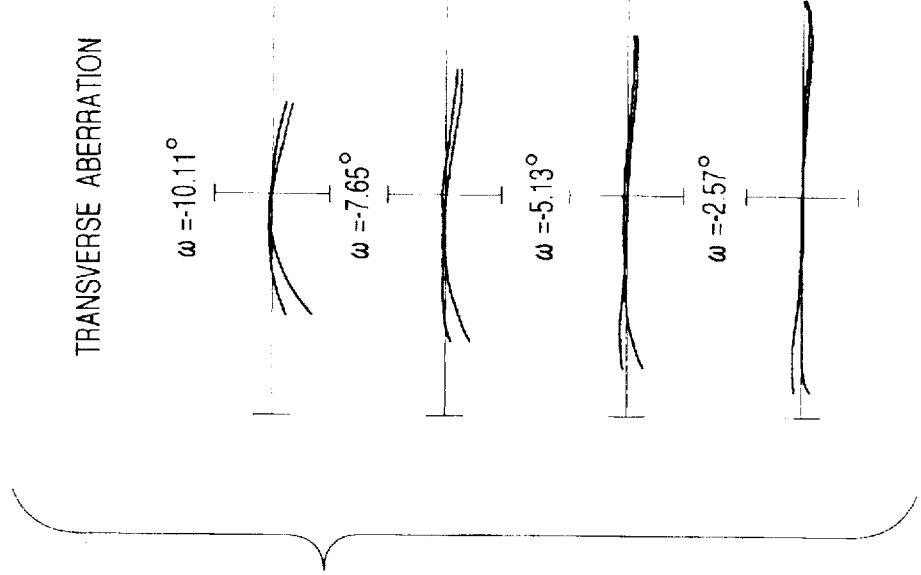
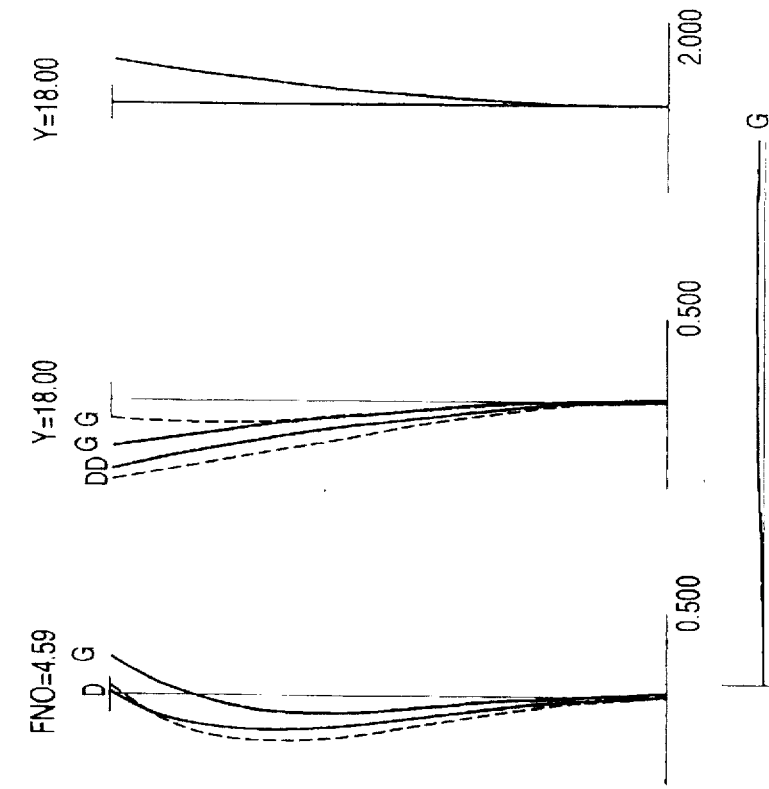
FIG. 6A  FIG. 6B  FIG. 6C
FIG. 6D
FIG. 6E

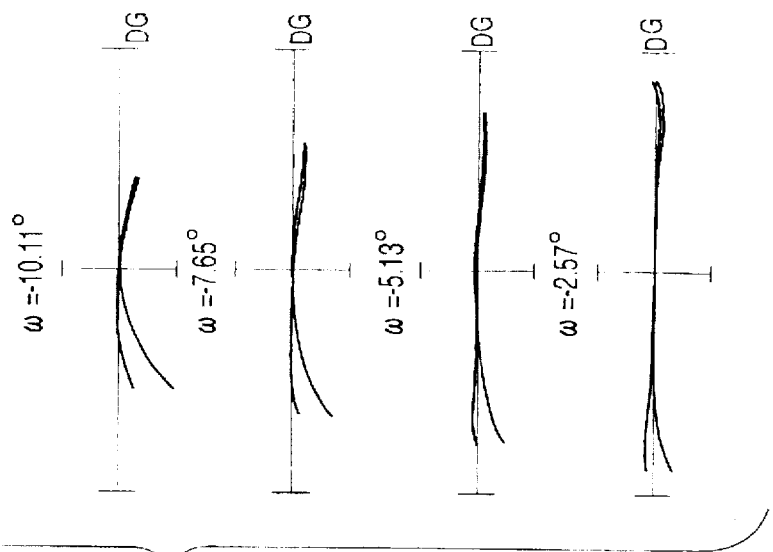
FIG. 12A  FIG. 12B  FIG. 12C
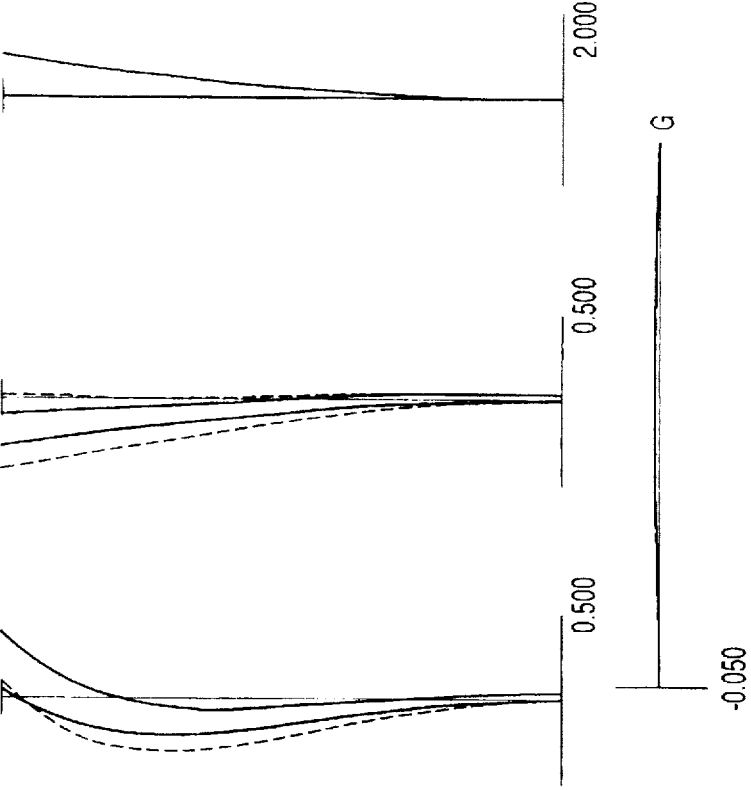
FIG. 12D
FIG. 12E

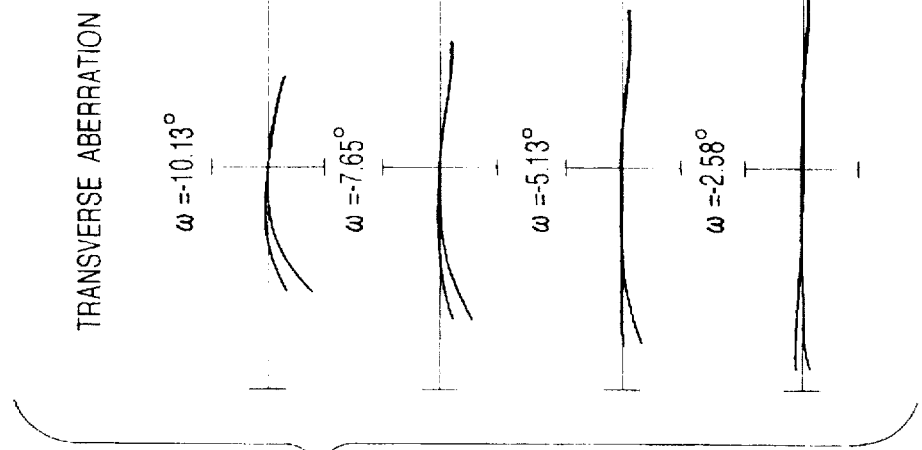
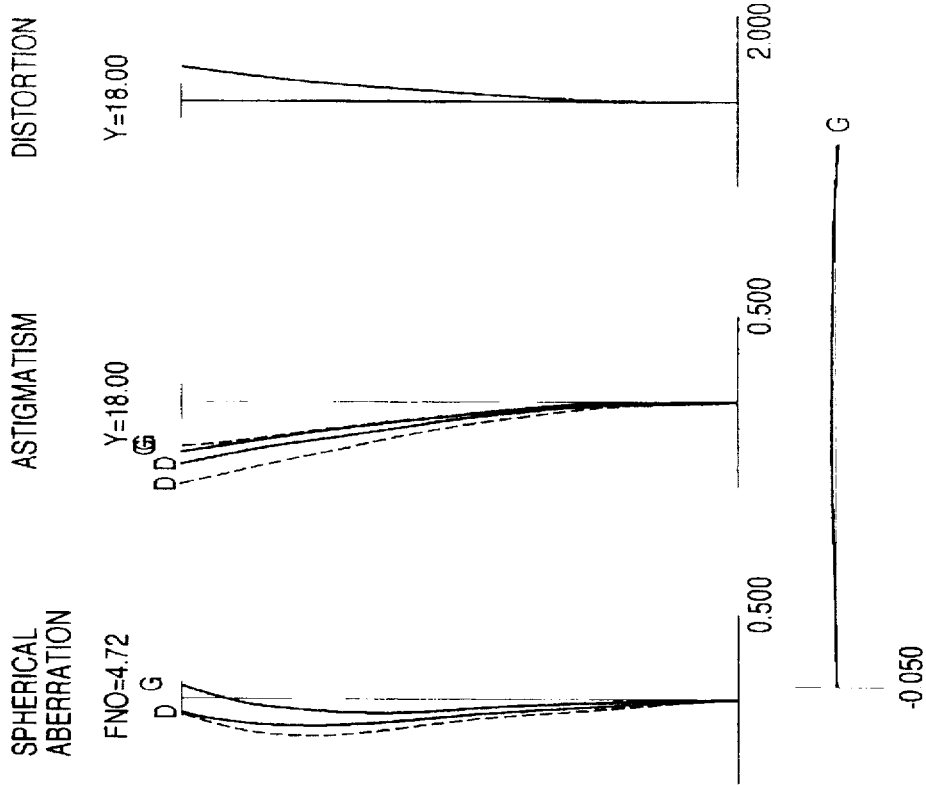

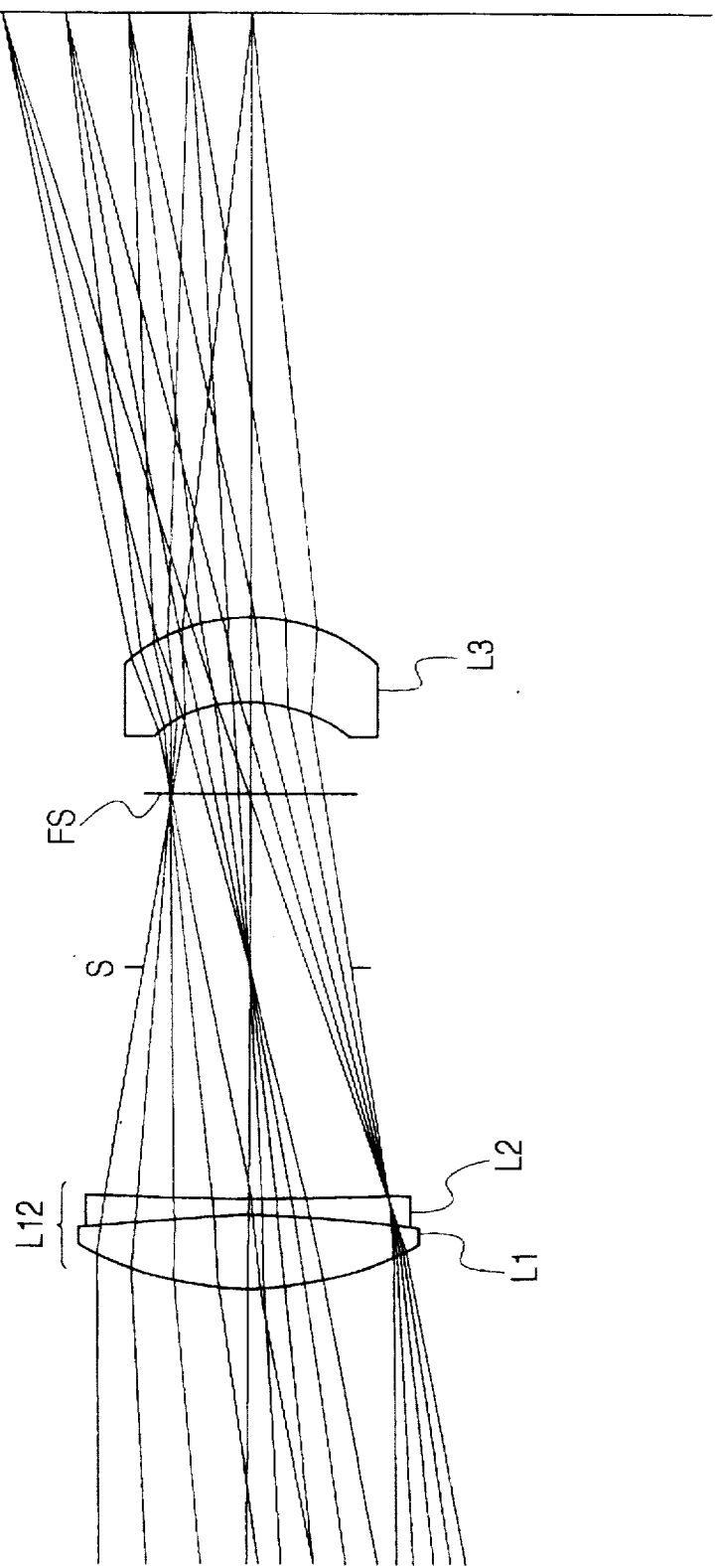

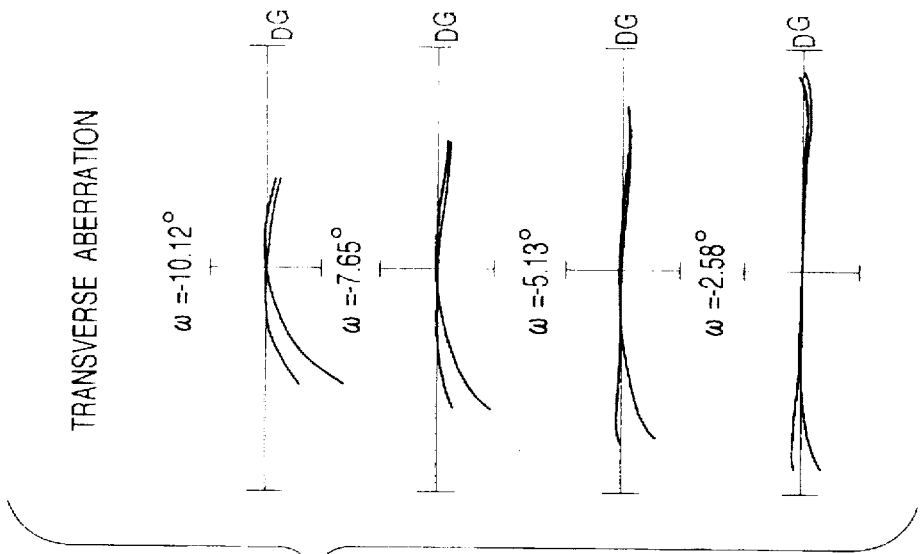
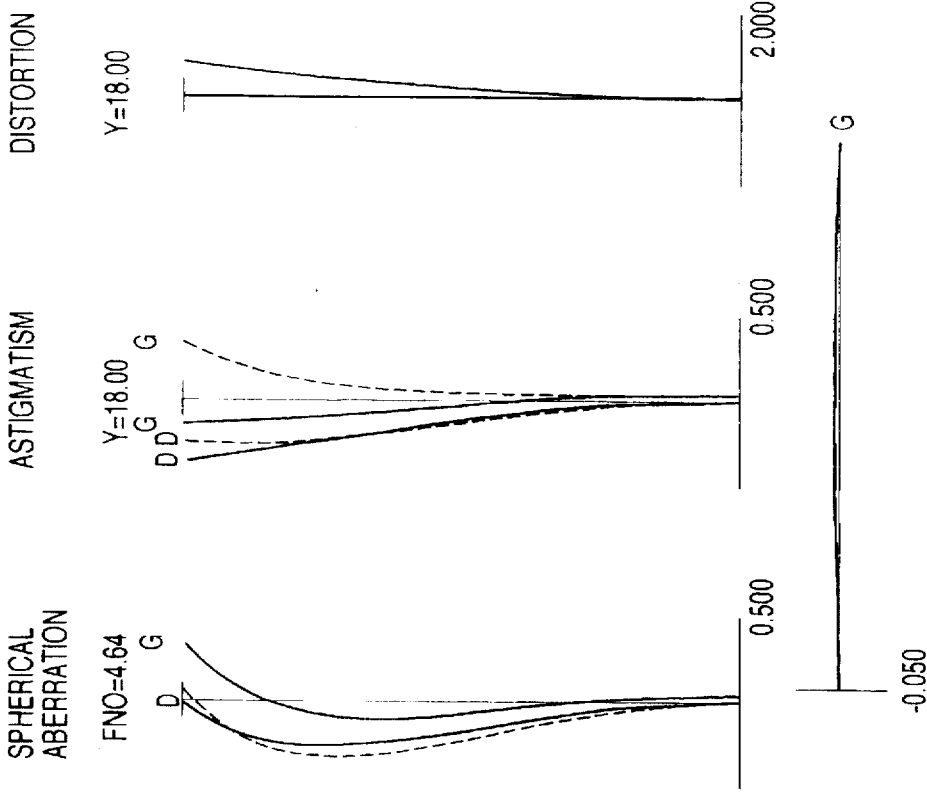
FIG. 18A  FIG. 18B  FIG. 18C  FIG. 18D  FIG. 18E

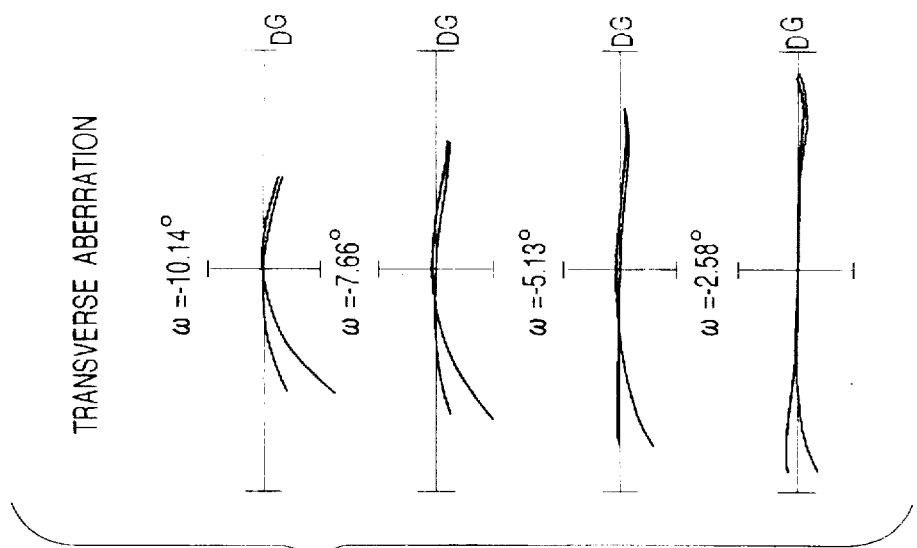
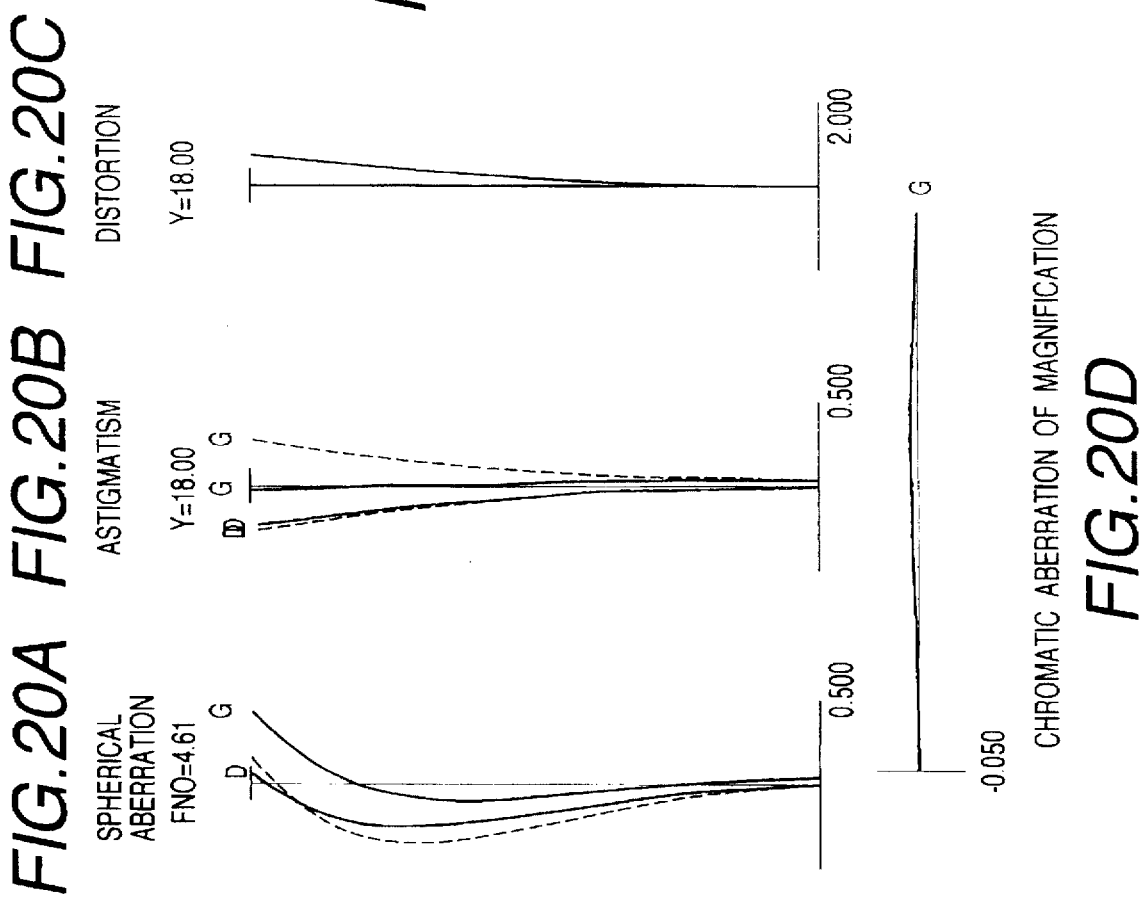

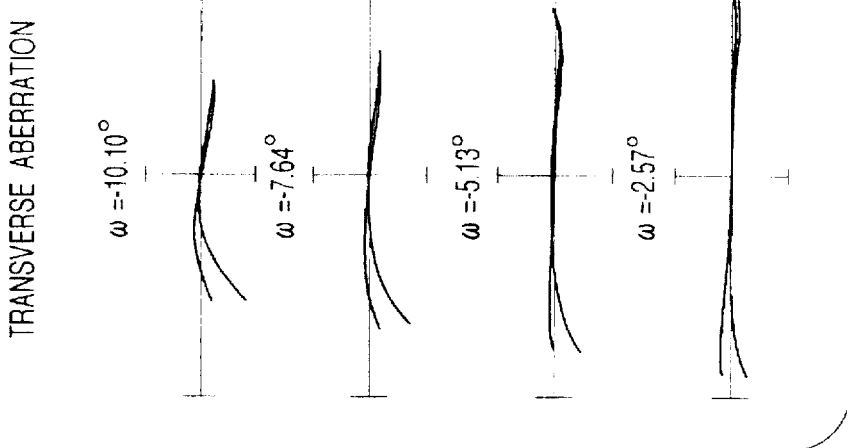
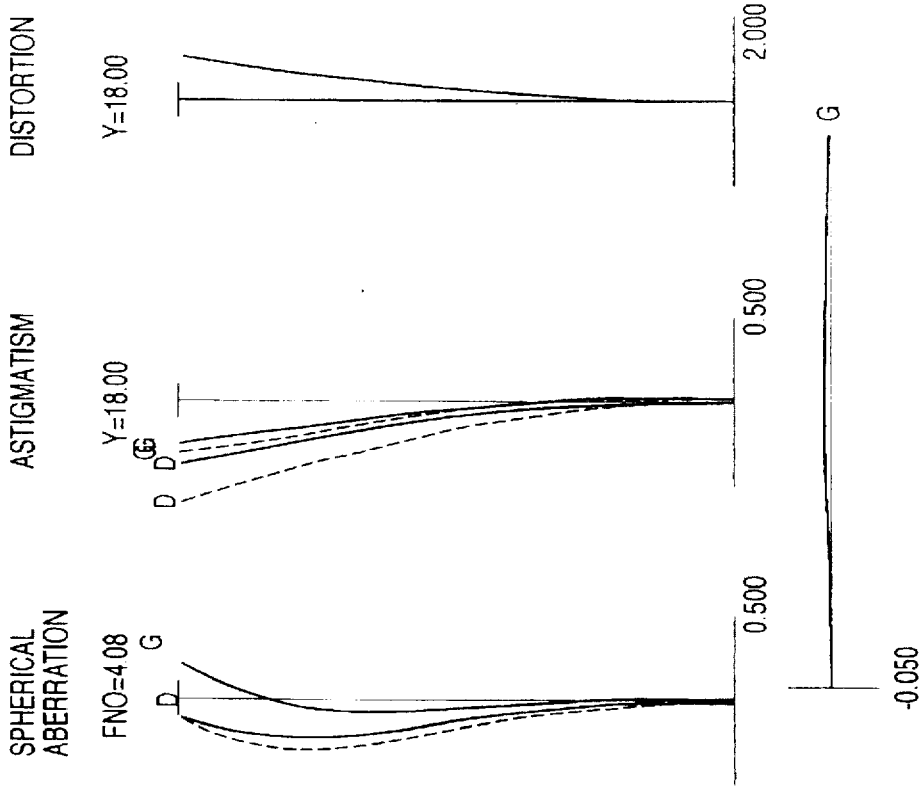
FIG.22A   FIG.22B   FIG.22C   FIG.22D   FIG.22E

TELEPHOTO LENS

BACKGROUND OF THE INVENTION

1. Field of the Invention

The present invention relates to a telephoto lens and, more particularly, to a telephoto lens used for a still camera or the like.

2. Related Background Art

A telephoto lens with an adequate field angle and a natural perspective allows taking a close-up photograph from a position separated from an object by a certain distance. Therefore, the telephoto lens is popularly used for portraiture or close-up photographing of a flower.

For a conventional telephoto lens of this type, a so-called Ernostar or Gauss type structure is preferably used because of its excellent spherical aberration correction properties. Various proposals have been made for an advanced telephoto lens of this type.

However, a conventional telephoto lens of an Ernostar type requires at least four lenses. A telephoto lens of a Gauss type requires five or six lenses. That is, these conventional telephoto lenses have a very complex structure to be manufactured.

SUMMARY OF THE INVENTION

The present invention has been made in consideration of the above problem, and has as its object to provide a telephoto lens with a two-group three-lens structure for which various aberrations are satisfactorily corrected.

In order to solve the above problem, according to the present invention, there is provided a telephoto lens comprising, in the following order from the object side, a positive cemented lens component L12 composed of a biconvex lens L1 and a biconcave lens L2 and having a meniscus shape as a whole with the convex side facing the object side, and a negative meniscus lens component L3 with the convex side facing the image side.

It is preferable that the telephoto lens satisfy the following conditions:

$0.23 < r1/f < 0.33$ $-0.13 < r4/f < -0.09$ $0.51 < (r4-r5)/d4 < 0.7$ $0.32 < d3/f < 0.45$ $0.05 < n2-n1$ $1.8 < r3/\{f \cdot (n2-n1)^{1/2}\} < 3.5$ $0.145 < n2-23/v2-n1+40/v1 < 0.27$ $50 < v3$ where f is the focal length of an entire lens system in an infinite in-focus state, r1 is the radius of curvature of the object-side surface of the biconvex lens L1, r3 is the radius of curvature of the image-side surface of the biconcave lens L2, r4 is the radius of curvature of the object-side surface of the negative meniscus lens component L3, r5 is the radius of curvature of the image-side surface of the negative meniscus lens component L3, d3 is the on-axis air gap between the positive cemented lens component L12 having the meniscus shape and the negative meniscus lens component L3, d4 is the on-axis thickness of the negative meniscus lens component L3, n1 is the refractive index for the d-line of the biconvex lens L1, n2 is the refractive index for the d-line of the biconcave lens L2, v1 is the Abbe number of the biconvex lens L1, v2 is the Abbe number of the biconcave lens L2, and v3 is the Abbe number of the negative meniscus lens component L3.

As described above, the telephoto lens of the present invention is a lens system having a two-group three-lens structure comprising, in the following order from the object side, the positive cemented lens component L12 composed of the biconvex lens L1 and the biconcave lens L2 and having the meniscus shape as a whole with the convex side facing the object side, and the negative meniscus lens component L3 with the convex side facing the image side.

The positive cemented lens component L12 having the meniscus shape is a front group having a converging effect. To effectively correct a spherical aberration, a chromatic aberration, or a coma, the positive cemented lens component L12 is composed of the biconvex lens L1 and the biconcave lens L2.

On the other hand, the negative meniscus lens component L3 with the convex side facing the image side is a rear group having a diverging effect. The negative meniscus lens component L3 has a function as a so-called field flattener for correcting a curvature of field remaining in the front group having an imaging effect. With this structure, the entire lens system constitutes a telephoto type lens.

The lens system having the two-group three-lens structure of this type has been conventionally known and put in practice as a so-called small-aperture supertelephoto lens having a field angle of about 5° to 10° and an F-number of about 5.6 to 8. However, there is no lens system with the two-group three-lens structure having a wide field angle of about 20° and a brightness corresponding to an F-number of about 4.5.

In the present invention with the above two-group three-lens structure, the refracting power arrangement and selection of optical materials are drastically reconsidered, thereby achieving a wide field angle and a large aperture.

The shape of the third lens component constituting the rear group will be described first.

As the shape of the third lens component, a negative meniscus shape with the convex side facing the object side, or a negative meniscus shape with the convex side facing the image side as in the present invention has been known. That is, the third lens component can have two different types in shape. Therefore, a solution representing the third lens component having a biconcave shape seems to be present as an intermediate shape of these two types.

However, when the third lens component is constituted by a single biconvex lens, an astigmatism and a chromatic aberration of magnification become large, so no satisfactory correction of various aberrations can be expected. On the other hand, when the third lens component is constituted to have a negative meniscus shape with the convex side facing the object side, a spherical aberration can be satisfactorily corrected as compared to the present invention having a negative meniscus shape with the convex side facing the image side. However, when the third lens component is constituted to have the negative meniscus shape with the convex side facing the object side, and the field angle is to be widened, a distortion and an astigmatism cannot be satisfactorily corrected, and a variation in image plane caused due to the camera-to-subject distance becomes large.

As described above, the telephoto lens is often used at a relatively small camera-to-subject distance and requires a wide field angle. Therefore, the present invention employs, as the shape of the third lens component, the meniscus shape with the convex side facing the image side. The cemented lens component constituting the front group also has the meniscus shape with the convex side facing the object side. With this structure, the present invention suppresses an astigmatism or distortion, satisfactorily corrects a spherical aberration, and increases the field angle by satisfying predetermined conditional formulas.

The conditional formulas of the present invention will be described below.

It is preferable that the telephoto lens of the present invention satisfy the following conditional formulas (1) to (8):

$$0.23 < r1/f < 0.33 \qquad (1)$$

$$-0.13 < r4/f < -0.09 \qquad (2)$$

$$0.51 < (r4-r5)/d4 < 0.7 \qquad (3)$$

$$0.32 < d3/f < 0.45 \qquad (4)$$

$$0.05 < n2-n1 \qquad (5)$$

$$1.8 < r3/\{f \cdot (n2-n1)^{1/2}\} < 3.5 \qquad (6)$$

$$0.145 < n2 - 23/v2 - n1 + 40/v1 < 0.27 \qquad (7)$$

$$50 < v3 \qquad (8)$$

where f: the focal length of the entire lens system r1: the radius of curvature of the object-side surface of the biconvex lens L1 r3: the radius of curvature of the image-side surface of the biconcave lens L2 r4: the radius of curvature of the object-side surface of the negative meniscus lens component L3 r5: the radius of curvature of the image-side surface of the negative meniscus lens component L3 d3: the on-axis air gap between the positive cemented lens component L12 having the meniscus shape and the negative meniscus lens component L3 d4: the on-axis thickness of the negative meniscus lens component L3 n1: the refractive index for the d-line of the biconvex lens L1 n2: the refractive index for the d-line of the biconcave lens L2 v1: the Abbe number of the biconvex lens L1 v2: the Abbe number of the biconcave lens L2 v3: the Abbe number of the negative meniscus lens component L3

Conditional formula (1) is associated with correction of a spherical aberration and an astigmatism.

When r1/f of conditional formula (1) exceeds the upper limit value, a zonal spherical aberration can be satisfactorily corrected. However, an astigmatism can hardly be corrected, resulting in a large degradation in performance at the periphery of the field.

To the contrary, when r1/f of conditional formula (1) is smaller than the lower limit value, the zonal spherical aberration becomes large, resulting in a degradation in performance at the center of the field.

Conditional formula (2) is associated with correction of a distortion and a chromatic aberration of magnification.

When r4/f of conditional formula (2) is smaller than the lower limit value, and the third lens component is constituted by a single lens, as in the present invention, a distortion and a chromatic aberration of magnification can hardly be corrected.

When r4/f of conditional formula (2) exceeds the upper limit value, a coma can hardly be corrected.

Conditional formula (3) is associated with correction of a spherical aberration and curvature of field.

When (r4−r5)/d4 of conditional formula (3) is smaller than the lower limit value, the curvature of the image-side surface of the negative meniscus lens component L3 becomes too large, resulting in insufficient correction of a spherical aberration and an increase in Petzval sum in the positive direction. As a result, the flatness of the image plane is degraded.

To the contrary, when (r4−r5)/d4 of conditional formula (3) exceeds the upper limit value, the curvature of the image-side surface of the negative meniscus lens component L3 becomes too small, resulting in excessive correction of a positive coma and a spherical aberration. In addition, since the shape of the negative meniscus lens component L3 becomes close to a concentric shape, a difficulty in lens fabrication increases.

Conditional formula (4) represents a condition for simultaneously realizing a brightness corresponding to an F-number of about 4.5 and a wide field angle of 20° or more.

When d3/f of conditional formula (4) exceeds the upper limit value, a zonal spherical aberration can be advantageously suppressed. However, the curvature of the meridional image plane tends to increase, resulting in a difficulty in maintaining a wide field angle. In addition, the variation in image plane caused due to the camera-to-subject distance becomes large.

To the contrary, when d3/f of conditional formula (4) is smaller than the lower limit value, the zonal spherical aberration becomes large, and a tendency to increase the variation in spherical aberration due to the camera-to-subject distance is generated.

More specifically, by satisfying conditional formula (4), an optimum balance between the image plane and the spherical aberration can be obtained for the above-described specifications (the F-number and the wide field angle). In addition, a degradation in performance caused due to a change in camera-to-subject distance can be minimized.

Conditional formula (5) is an assumption of conditional formulas (6) and (7) and associated with an improvement in workability in manufacturing.

Generally, to correct a spherical aberration with a positive cemented lens, the refractive index of the negative lens must be higher than that of the positive lens. As the difference between the refractive indices becomes larger, the curvature of the junction interface can be made smaller.

Therefore, when n2−n1 of conditional formula (5) is smaller than the lower limit value, the curvature of the junction interface between the biconvex lens L1 and the biconcave lens L2 becomes too large, resulting in a deterioration in workability in lens polishing process. In addition, when n2−n1 of conditional formula (5) is smaller than the lower limit value, the central thickness of the biconvex lens L1 must be increased to ensure the thickness of the edge of the biconvex lens L1. As a result, the volume of the lens increases to result in an increase in cost. Furthermore, from the viewpoint of aberration correction, as the central thickness of the biconvex lens L1 becomes larger, a tendency to gradually increase the zonal spherical aberration or a chromatic aberration at the periphery of the field is produced. To further satisfactorily correct the spherical aberration, the refractive index of the biconcave lens L2 is preferably 1.74 or more (i.e., $n2 \geq 1.74$).

Conditional formula (6) is associated with correction of an astigmatism.

When $r3/\{f \cdot (n2-n1)^{1/2}\}$ of conditional formula (6) is smaller than the lower limit value, the curvature of the image-side surface of the biconcave lens L2 becomes too large, resulting in a large astigmatism in the positive direction.

To the contrary, when $r3/\{f \cdot (n2-n1)^{1/2}\}$ of conditional formula (6) exceeds the upper limit value, the astigmatism in the negative direction becomes large.

Conditional formula (7) defines an optimum combination of optical materials of the biconvex lens L1 and the biconcave lens L2.

The lens system with the two-group three-lens structure has an insufficient degree of freedom to correct all aberrations, unlike a general triplet lens with a three-group three-lens structure. Therefore, without optimum selection of optical materials to be used, some aberrations and, more particularly, a coma and a chromatic aberration of magnification cannot be satisfactorily corrected.

When $n2-23/v2-n1+40/v1$ of conditional formula (7) exceeds the upper limit value, a negative coma and a chromatic aberration of magnification become large in the negative direction.

On the other hand, when $n2-23/v2-n1+40/v1$ of conditional formula (7) is smaller than the lower limit value, a positive coma and a positive chromatic aberration of magnification remain.

Correction of a zonal spherical aberration is facilitated as the value of the conditional formula (7) becomes large. Therefore, to improve the performance at the central portion of the field, it is preferable to select an optical material for making the value of conditional formula (7) close to the upper limit value and slightly leave the astigmatism, thereby reducing the remaining positive coma and achieving balanced performance.

Conditional formula (8) is associated with satisfactory correction of a chromatic aberration of magnification.

When v3 of conditional formula (8) is smaller than the lower limit value, a positive chromatic aberration of magnification generated in the negative meniscus lens component L3 can hardly be corrected.

It is ideal that the above-described eight conditions be satisfied. However, the effect of the present invention can be obtained by satisfying only some of these conditions. For example, when only condition (3) or only conditions (5) and (7) are satisfied, an advantageous effect can be obtained.

BRIEF DESCRIPTION OF THE DRAWINGS

FIGS. 2A to 2E are graphs showing various aberrations in the first embodiment of the present invention;

FIGS. 4A to 4E are graphs showing various aberrations in the second embodiment of the present invention;

FIGS. 6A to 6E are graphs showing various aberrations in the third embodiment of the present invention;

FIGS. 10A to 10E are graphs showing various aberrations in the fifth embodiment of the present invention;

FIGS. 12A to 12E are graphs showing various aberrations in the sixth embodiment of the present invention;

FIGS. 16A to 16E are graphs showing various aberrations in the eighth embodiment of the present invention;

FIG. 17 is a diagram showing the lens arrangement of a telephoto lens according to a ninth embodiment of the present invention;

FIGS. 18A to 18E are graphs showing various aberrations in the ninth embodiment of the present invention;

FIGS. 20A to 20E are graphs showing various aberrations in the tenth embodiment of the present invention;

FIGS. 22A to 22E are graphs showing various aberrations in the eleventh embodiment of the present invention.

DETAILED DESCRIPTION OF THE PREFERRED EMBODIMENTS

The telephoto lens according to each embodiment of the present invention comprises, in the following order from the object side, a positive cemented lens component L12 composed of a biconvex lens L1 and a biconcave lens L2 and having a meniscus shape as a whole with the convex side facing the object side, and a negative meniscus lens component L3 with the convex side facing the image side.

The embodiments of the present invention will be described below with reference to the accompanying drawings.

[First Embodiment]

Figure 1:
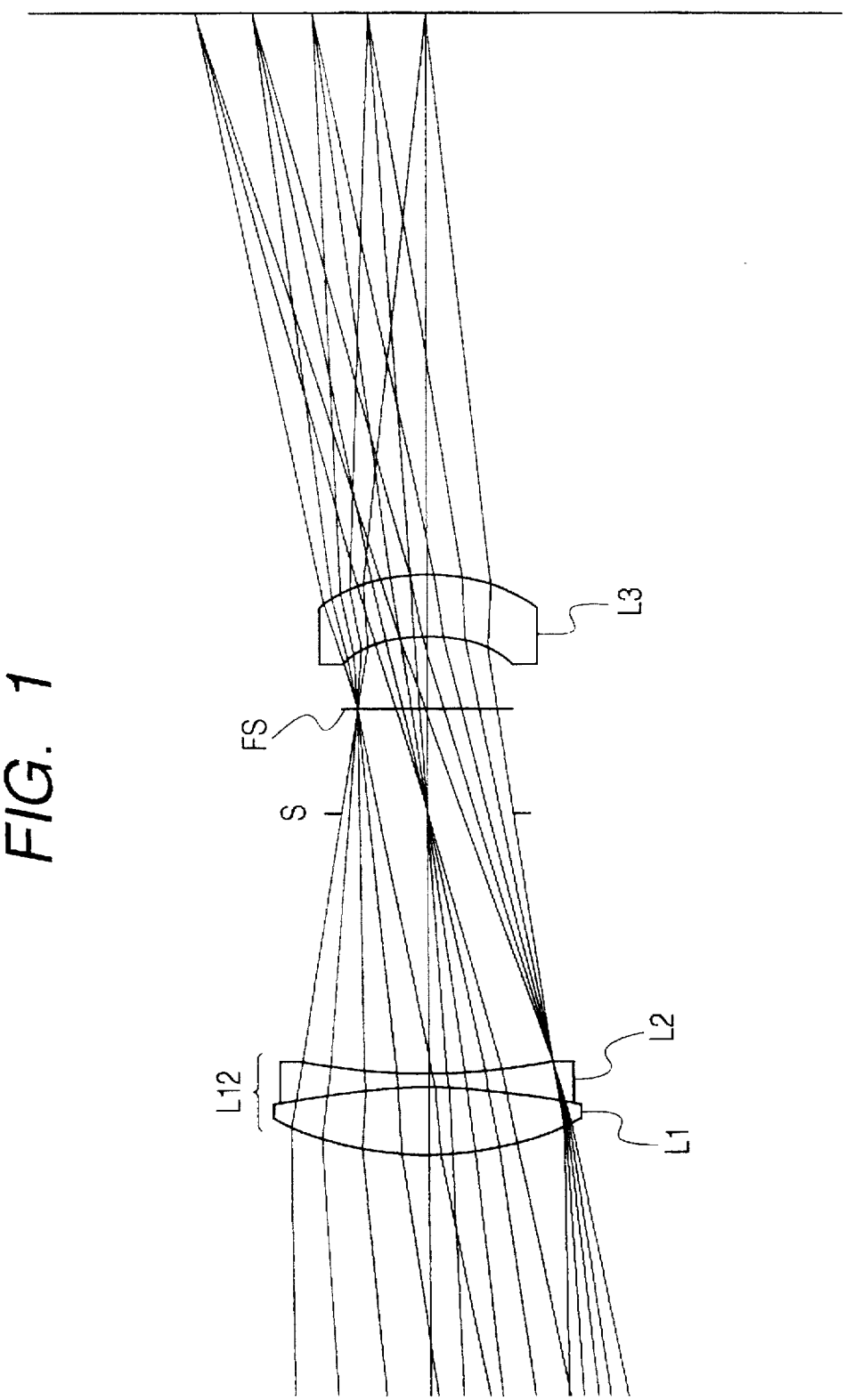
FIG. 1 is a diagram showing the lens arrangement of a telephoto lens according to a first embodiment of the present invention.

FIG. 1 is a diagram showing the lens arrangement of a telephoto lens according to the first embodiment of the present invention.

The telephoto lens shown in FIG. 1 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 1 shows numerical data of the first embodiment of the present invention. In Table 1, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

TABLE 1 f = 100.000
Bf = 45.079
FN = 4.59
2ω = 20.2°
TL = 0.918

| | r | d | n | ν |
|---|---|---|---|---|
| 1 | 26.8467 | 5.4167 | 1.69350 | 53.35 |
| 2 | −52.1397 | 1.2500 | 1.74950 | 35.19 |
| 3 | 59.0018 | 20.8333 | | |
| 4 | ∞ | 8.3333 | (aperture stop S) | |
| 5 | ∞ | 5.8333 | (fixed stop FS) | |
| 6 | −11.2957 | 5.0000 | 1.51860 | 69.98 |
| 7 | −14.3229 | 45.0788 | | |

(Condition Corresponding Values)

| | |
|---|---|
| (1) r1/f = | 0.268 |
| (2) r4/f = | −0.113 |
| (3) (r4 − r5)/d4 = | 0.605 |
| (4) d3/f = | 0.350 |
| (5) n2 − n1 = | 0.056 |
| (6) r3/{f · (n2 − n1)$^{1/2}$} = | 2.493 |
| (7) n2 − 23/ν2 − n1 + 40/ν1 = | 0.152 |
| (8) ν3 = | 70.0 |

FIGS. 2A to 2E are graphs showing various aberrations in the first embodiment.

In these graphs, FNO is the F-number, Y is the image height, ω is the half field angle, D is the d-line (λ=587.6 nm), and G is the g-line (λ=435.8 nm).

In FIG. 2B showing an astigmatism, a solid curve represents the sagittal image plane, and a broken curve represents the meridional image plane. In addition, in FIG. 2A showing a spherical aberration, a broken curve represents the sine condition.

As can be seen from these graphs, in this embodiment, various aberrations are satisfactorily corrected.

[Second Embodiment]

Figure 3:
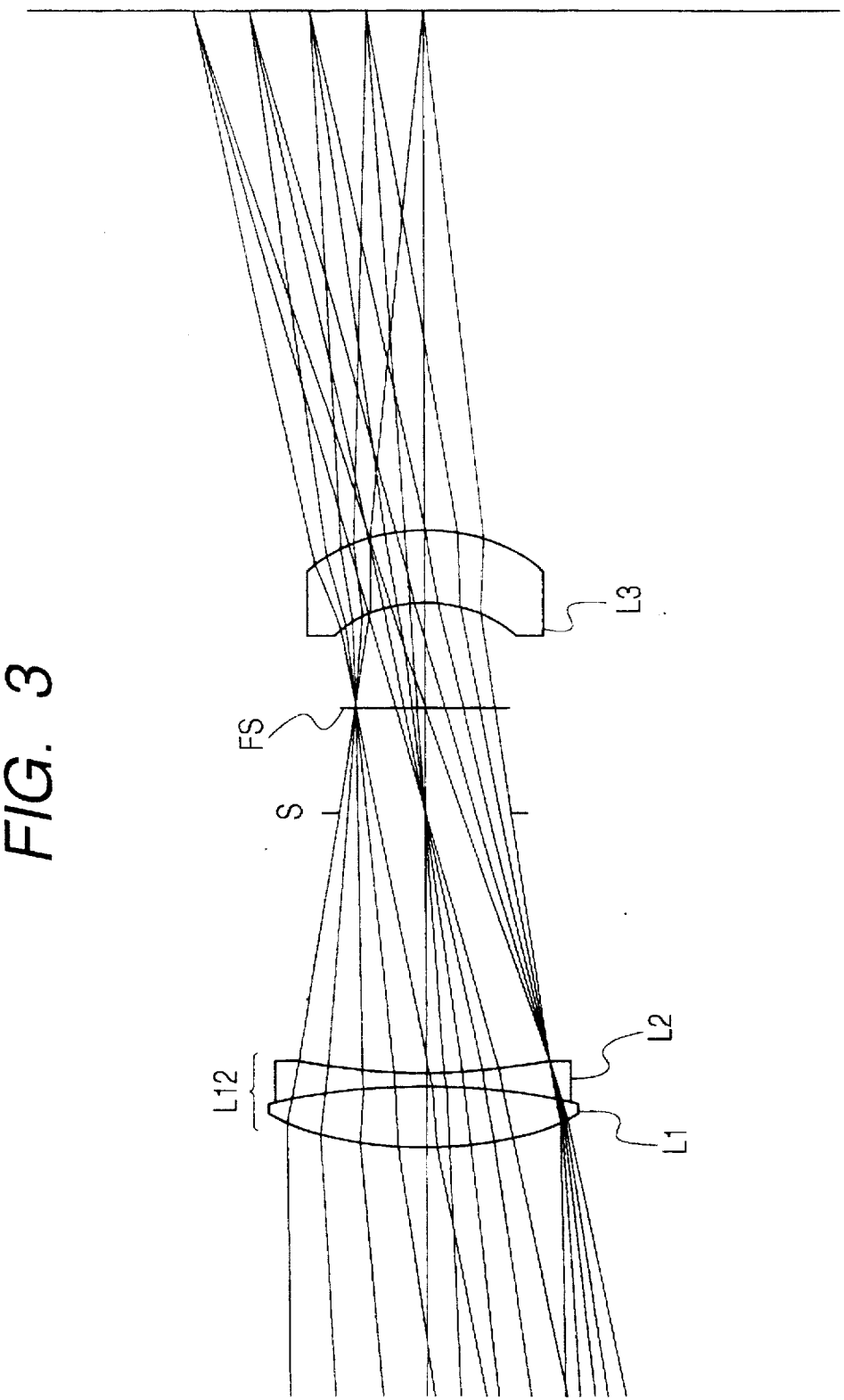
FIG. 3 is a diagram showing the lens arrangement of a telephoto lens according to a second embodiment of the present invention.

FIG. 3 is a diagram showing the lens arrangement of a telephoto lens according to the second embodiment of the present invention.

The telephoto lens shown in FIG. 3 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 2 shows numerical data of the second embodiment of the present invention. In Table 2, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

TABLE 2 f = 100.000
Bf = 41.742
FN = 4.62
2ω = 20.2°
TL = 0.914

| | r | d | n | ν |
|---|---|---|---|---|
| 1 | 28.1459 | 4.8333 | 1.71300 | 53.93 |
| 2 | −70.4657 | 1.1667 | 1.80384 | 33.89 |
| 3 | 69.5840 | 20.8333 | | |
| 4 | ∞ | 8.3333 | (aperture stop S) | |
| 5 | ∞ | 8.5000 | (fixed stop FS) | |
| 6 | −11.7287 | 6.0000 | 1.51860 | 69.98 |
| 7 | −15.3054 | 41.7425 | | |

(Condition Corresponding Values)

| | |
|---|---|
| (1) r1/f = | 0.281 |
| (2) r4/f = | −0.117 |
| (3) (r4 − r5)/d4 = | 0.596 |
| (4) d3/f = | 0.377 |
| (5) n2 − n1 = | 0.091 |
| (6) r3/{f · (n2 − n1)$^{1/2}$} = | 2.309 |
| (7) n2 − 23/ν2 − n1 + 40/ν1 = | 0.154 |
| (8) ν3 = | 70.0 |

FIGS. 4A to 4E are graphs showing various aberrations in the second embodiment.

In these graphs, FNO is the F-number, Y is the image height, ω is the half field angle, D is the d-line (λ=587.6 nm), and G is the g-line (λ=435.8 nm).

In FIG. 4B showing an astigmatism, a solid curve represents the sagittal image plane, and a broken curve represents the meridional image plane. In addition, in FIG. 4A showing a spherical aberration, a broken curve represents the sine condition.

As can be seen from these graphs, in this embodiment, various aberrations are satisfactorily corrected.

[Third Embodiment]

Figure 5:
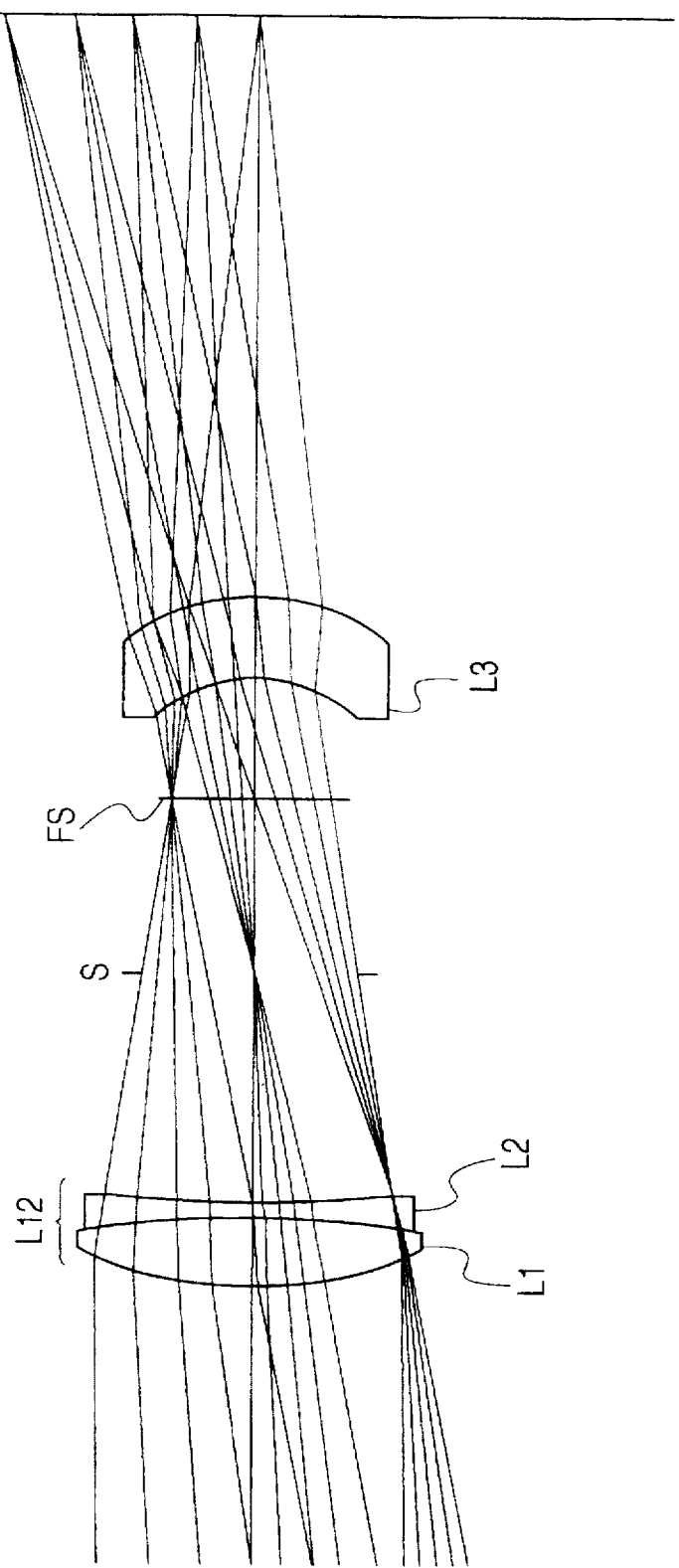
FIG. 5 is a diagram showing the lens arrangement of a telephoto lens according to a third embodiment of the present invention.

FIG. 5 is a diagram showing the lens arrangement of a telephoto lens according to the third embodiment of the present invention.

The telephoto lens shown in FIG. 5 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 3 shows numerical data of the third embodiment of the present invention. In Table 3, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

TABLE 3 f = 100.000
Bf = 42.266
FN = 4.59
2ω= 20.2°
TL = 0.920

| | r | d | n | ν |
|---|---|---|---|---|
| 1 | 27.0615 | 4.8412 | 1.62041 | 60.14 |
| 2 | −91.0731 | 1.1686 | 1.80384 | 33.89 |
| 3 | 99.1462 | 16.6938 | | |
| 4 | ∞ | 12.5204 | (aperture stop S) | |
| 5 | ∞ | 8.5138 | (fixed stop FS) | |
| 6 | −11.4847 | 6.0098 | 1.51680 | 64.10 |
| 7 | −14.9687 | 42.2663 | | |

(Condition Corresponding Values)

| | |
|---|---|
| (1) r1/f = | 0.271 |
| (2) r4/f = | −0.115 |
| (3) (r4 − r5)/d4 = | 0.580 |
| (4) d3/f = | 0.377 |
| (5) n2 − n1 = | 0.183 |
| (6) r3/{f · (n2 − n1)$^{1/2}$} = | 2.315 |
| (7) n2 − 23/ν2 − n1 + 40/ν1 = | 0.170 |
| (8) ν3 = | 64.1 |

FIGS. 6A to 6E are graphs showing various aberrations in the third embodiment.

In these graphs, FNO is the F-number, Y is the image height, ω is the half field angle, D is the d-line (λ=587.6 nm), and G is the g-line (λ=435.8 nm).

In FIG. 6B showing an astigmatism, a solid curve represents the sagittal image plane, and a broken curve represents the meridional image plane. In addition, in FIG. 6A showing a spherical aberration, a broken curve represents the sine condition.

As can be seen from these graphs, in this embodiment, various aberrations are satisfactorily corrected.

[Fourth Embodiment]

Figure 7:
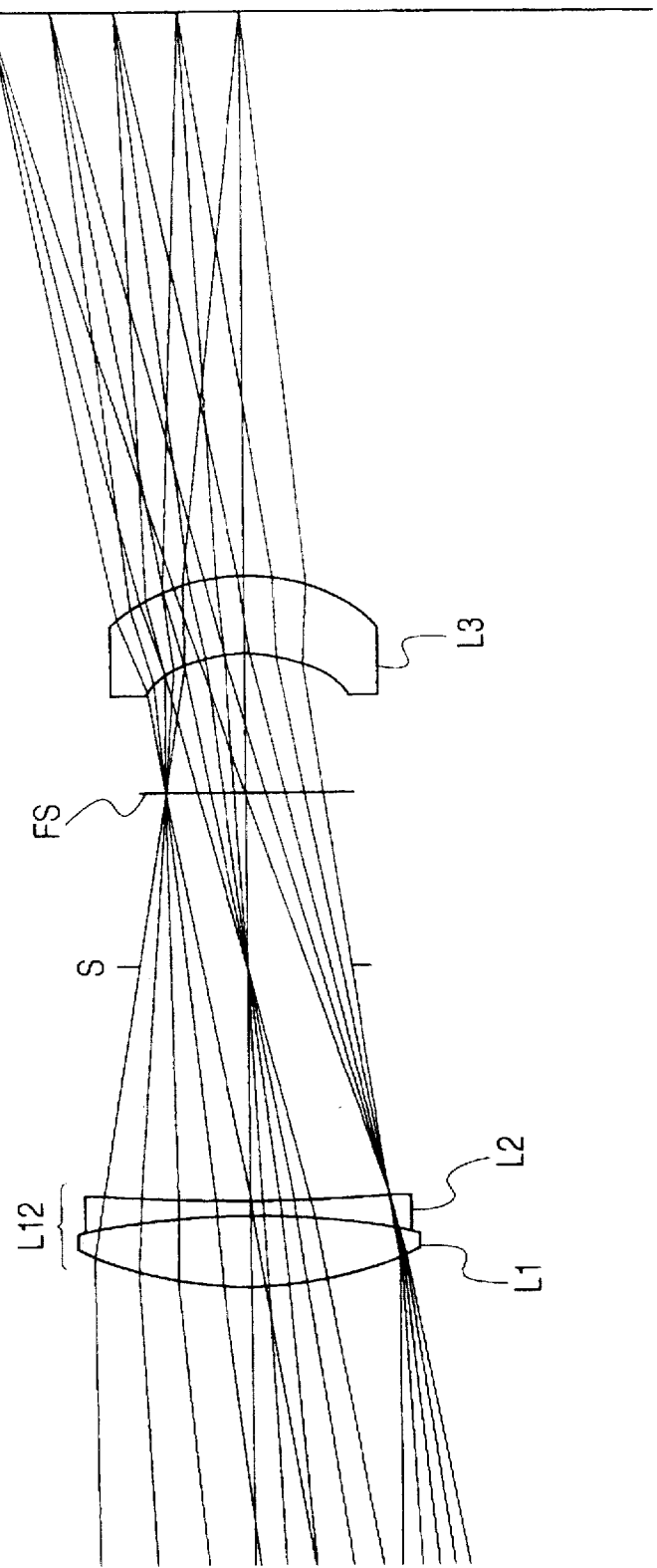
FIG. 7 is a diagram showing the lens arrangement of a telephoto lens according to a fourth embodiment of the present invention.

FIG. 7 is a diagram showing the lens arrangement of a telephoto lens according to the fourth embodiment of the present invention.

The telephoto lens shown in FIG. 7 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 4 shows numerical data of the fourth embodiment of the present invention. In Table 4, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

TABLE 4 f = 100.000
Bf = 40.657
FN = 4.60
2ω = 20.2°
TL = 0.918

| | r | d | n | ν |
|---|---|---|---|---|
| 1 | 26.9147 | 5.1667 | 1.58913 | 61.09 |
| 2 | −78.9097 | 1.1667 | 1.80384 | 33.89 |
| 3 | 129.1860 | 16.6667 | | |
| 4 | ∞ | 12.5000 | (aperture stop S) | |
| 5 | ∞ | 10.0000 | (fixed stop FS) | |
| 6 | −10.8276 | 5.6667 | 1.58913 | 61.09 |
| 7 | −14.0181 | 40.6570 | | |

(Condition Corresponding Values)

| | |
|---|---|
| (1) r1/f = | 0.269 |
| (2) r4/f = | −0.108 |
| (3) (r4 − r5)/d4 = | 0.563 |
| (4) d3/f = | 0.392 |
| (5) n2 − n1 = | 0.215 |
| (6) r3/{f · (n2 − n1)$^{1/2}$} = | 2.788 |
| (7) n2 − 23/ν2 − n1 + 40/ν1 = | 0.191 |
| (8) ν3 = | 61.1 |

FIGS. 8A to 8E are graphs showing various aberrations in the fourth embodiment.

In these graphs, FNO is the F-number, Y is the image height, ω is the half field angle, D is the d-line (λ=587.6 nm), and G is the g-line (λ=435.8 nm).

Figure 8E:
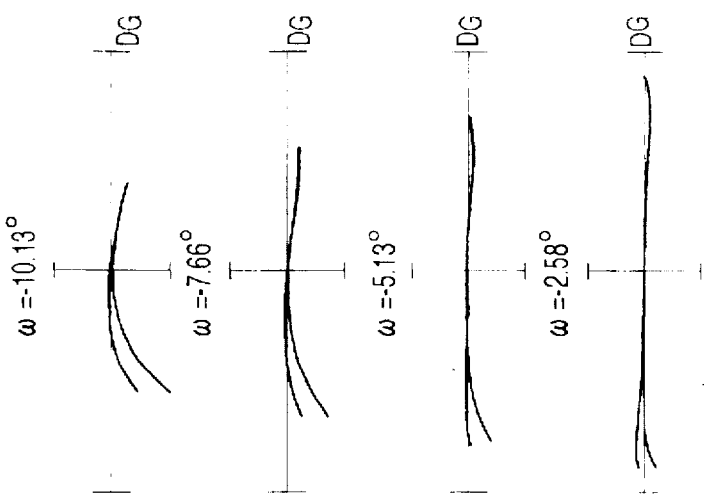
FIGS. 8A to 8E are graphs showing various aberrations in the fourth embodiment of the present invention.
Figures 8A, 8B, 8C, 8D:
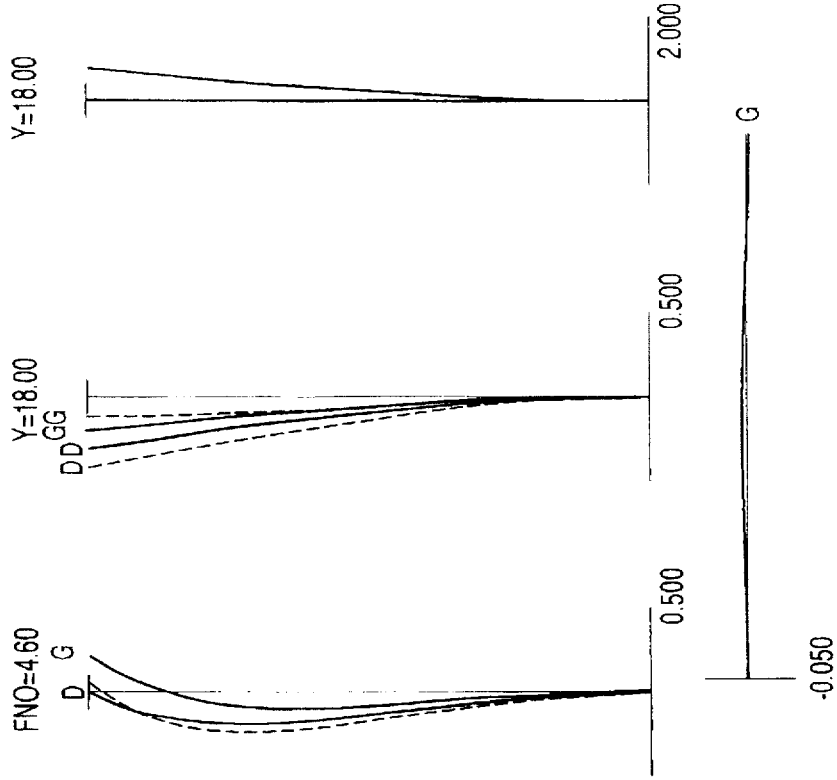

In FIG. 8B showing an astigmatism, a solid curve represents the sagittal image plane, and a broken curve represents the meridional image plane. In addition, in FIG. 8A showing a spherical aberration, a broken curve represents the sine condition.

As can be seen from these graphs, in this embodiment, various aberrations are satisfactorily corrected.

[Fifth Embodiment]

Figure 9:
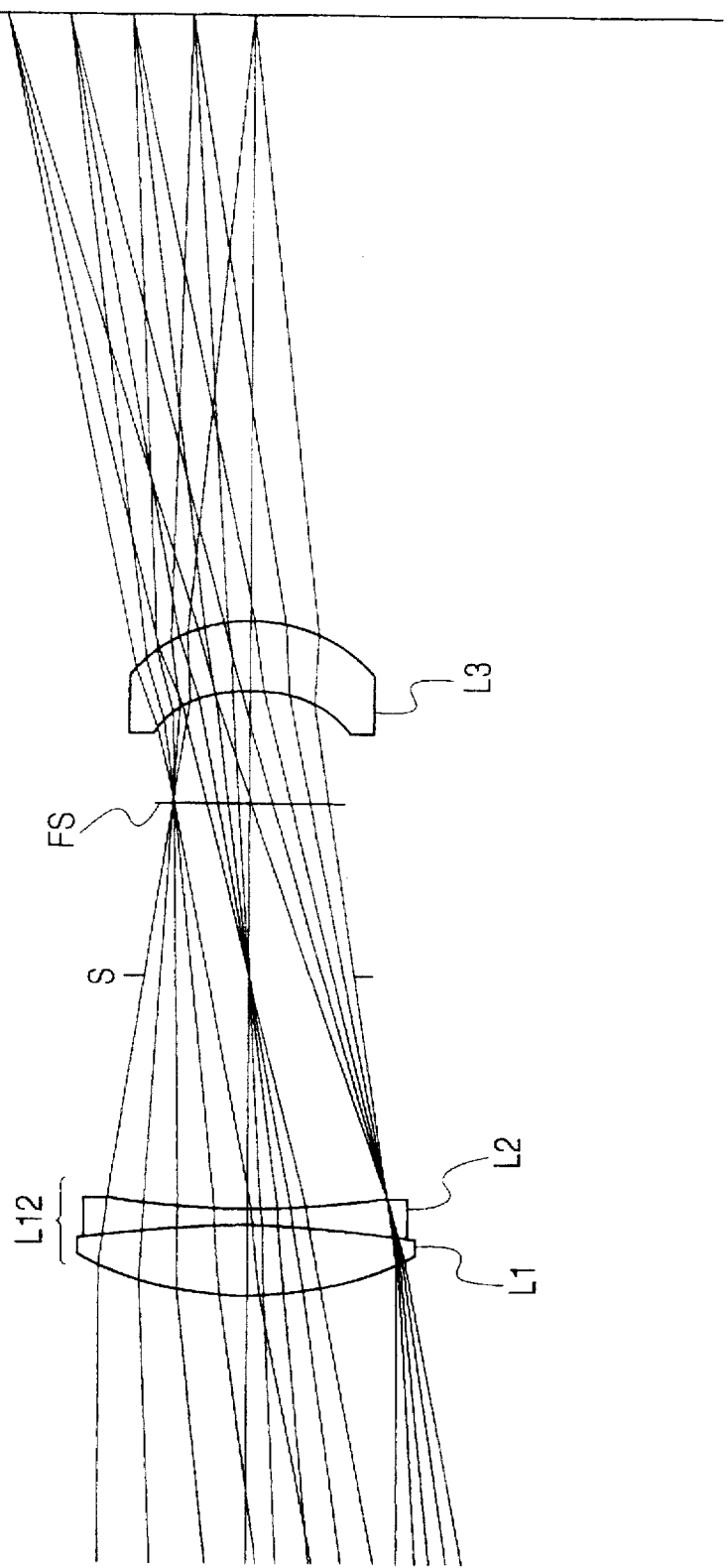
FIG. 9 is a diagram showing the lens arrangement of a telephoto lens according to a fifth embodiment of the present invention.
Figure 10D:
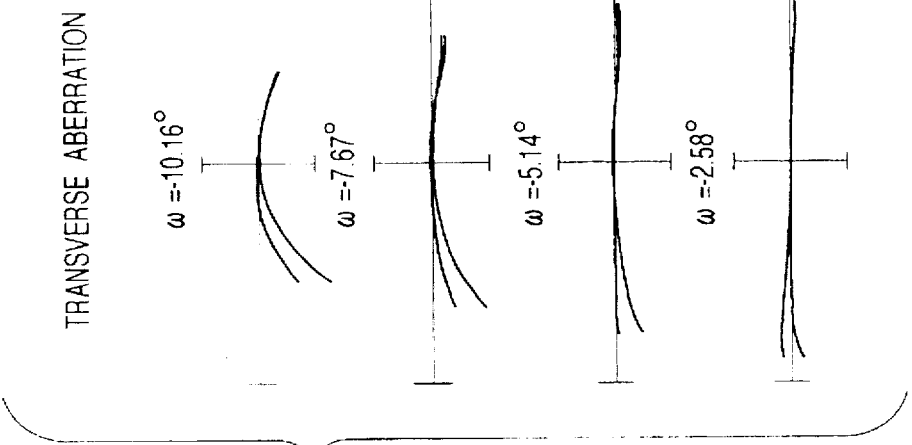
Figure 10E:
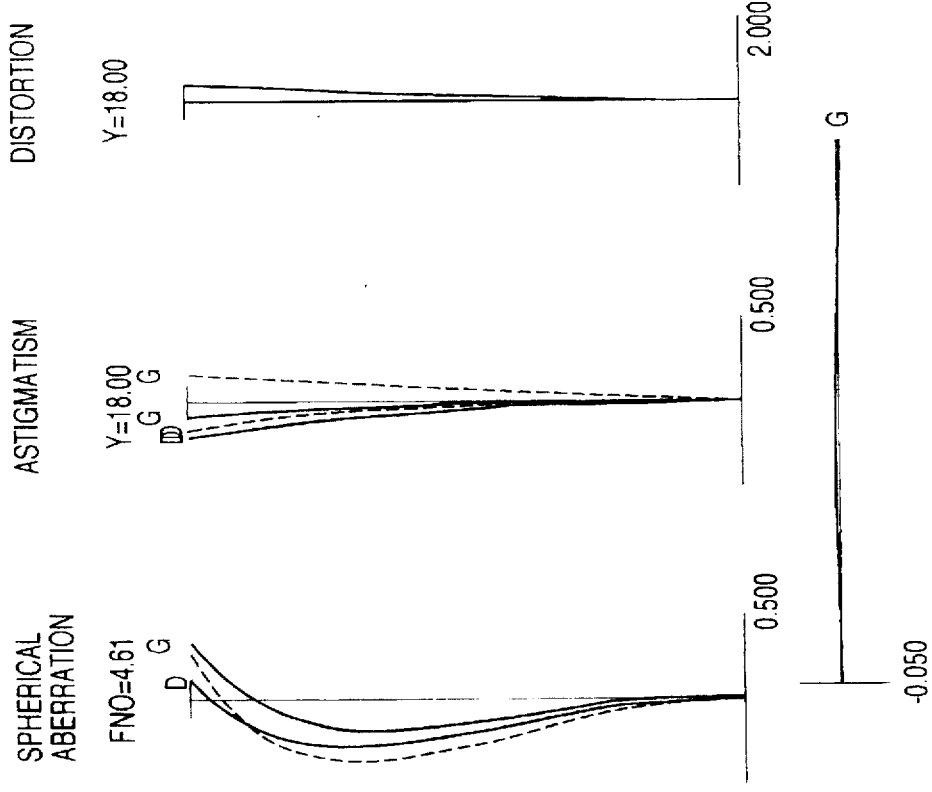

FIG. 9 is a diagram showing the lens arrangement of a telephoto lens according to the fifth embodiment of the present invention.

The telephoto lens shown in FIG. 9 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 5 shows numerical data of the fifth embodiment of the present invention. In Table 5, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surfaceto-surface distance, and n and ν are the refractive index and Abbe number for the d-line (λ=587.6 nm).

TABLE 5 f = 100.000
Bf = 43.905
FN = 4.60
2ω = 20.3°
TL = 0.924

| | r | d | n | ν |
|---|---|---|---|---|
| 1 | 25.4784 | 5.1667 | 1.62280 | 57.03 |
| 2 | −84.2205 | 1.1667 | 1.80384 | 33.89 |
| 3 | 79.1257 | 16.6667 | | |
| 4 | ∞ | 12.5000 | (aperture stop S) | |
| 5 | ∞ | 8.2500 | (fixed stop FS) | |
| 6 | −9.7885 | 4.7500 | 1.51823 | 58.90 |
| 7 | −12.2447 | 43.9054 | | |

(Condition Corresponding Values)

| | |
|---|---|
| (1) r1/f = | 0.255 |
| (2) r4/f = | −0.098 |
| (3) (r4 − r5)/d4 = | 0.517 |
| (4) d3/f = | 0.374 |
| (5) n2 − n1 = | 0.181 |
| (6) r3/{f · (n2 − n1)$^{1/2}$} = | 1.860 |
| (7) n2 − 23/ν2 − n1 + 40/ν1 = | 0.204 |
| (8) ν3 = | 58.9 |

FIGS. 10A to 10E are graphs showing various aberrations in the fifth embodiment.

In these graphs, FNO is the F-number, Y is the image height, ω is the half field angle, D is the d-line (λ=587.6 nm), and G is the g-line (λ=435.8 nm).

In FIG. 10B showing an astigmatism, a solid curve represents the sagittal image plane, and a broken curve represents the meridional image plane. In addition, in FIG. 10A showing a spherical aberration, a broken curve represents the sine condition.

As can be seen from these graphs, in this embodiment, various aberrations are satisfactorily corrected.

[Sixth Embodiment]

Figure 11:
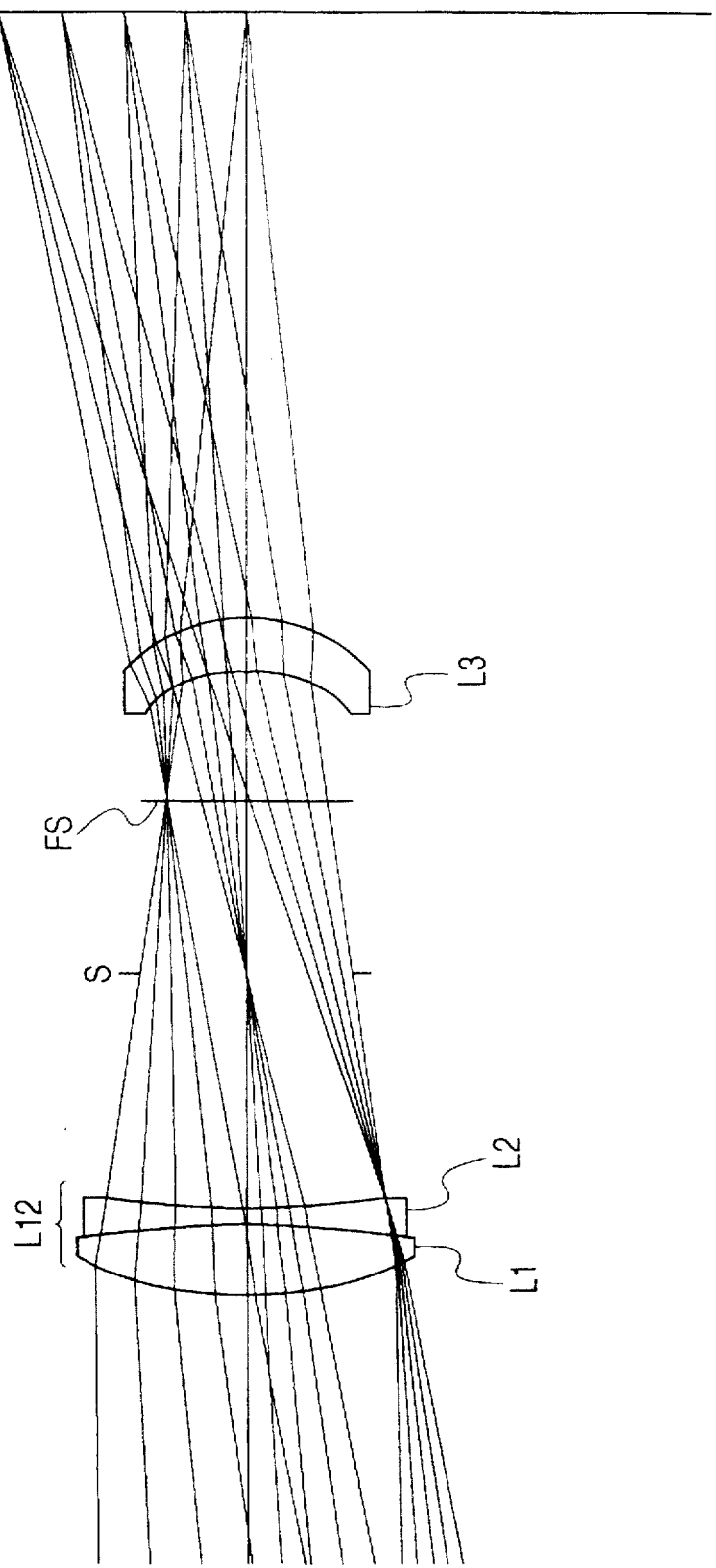
FIG. 11 is a diagram showing the lens arrangement of a telephoto lens according to a sixth embodiment of the present invention.

FIG. 11 is a diagram showing the lens arrangement of a telephoto lens according to the sixth embodiment of the present invention.

The telephoto lens shown in FIG. 11 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 6 shows numerical data of the sixth embodiment of the present invention. In Table 6, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

TABLE 6 f = 100.000
Bf = 43.642
FN = 4.59
2ω = 20.2°
TL = 0.925

| | r | d | n | ν |
|---|---|---|---|---|
| 1 | 28.8753 | 5.2500 | 1.73350 | 51.09 |
| 2 | −60.5560 | 1.1667 | 1.80384 | 33.89 |
| 3 | 63.4407 | 16.6667 | | |
| 4 | ∞ | 12.5000 | (aperture stop S) | |
| 5 | ∞ | 9.5000 | (fixed stop FS) | |
| 6 | −10.6828 | 3.7500 | 1.61720 | 54.01 |
| 7 | −12.8768 | 43.6419 | | |

(Condition Corresponding Values)

| | |
|---|---|
| (1) r1/f = | 0.289 |
| (2) r4/f = | −0.107 |
| (3) (r4 − r5)/d4 = | 0.585 |
| (4) d3/f = | 0.387 |
| (5) n2 − n1 = | 0.070 |
| (6) r3/{f · (n2 − n1)$^{1/2}$} = | 2.392 |
| (7) n2 − 23/ν2 − n1 + 40/ν1 = | 0.175 |
| (8) ν3 = | 54.0 |

FIGS. 12A to 12E are graphs showing various aberrations in the sixth embodiment.

In these graphs, FNO is the F-number, Y is the image height, ω is the half field angle, D is the d-line (λ=587.6 nm), and G is the g-line (λ=435.8 nm).

In FIG. 12B showing an astigmatism, a solid curve represents the sagittal image plane, and a broken curve represents the meridional image plane. In addition, in FIG. 12A showing a spherical aberration, a broken curve represents the sine condition.

As can be seen from these graphs, in this embodiment, various aberrations are satisfactorily corrected.

[Seventh Embodiment]

Figure 13:
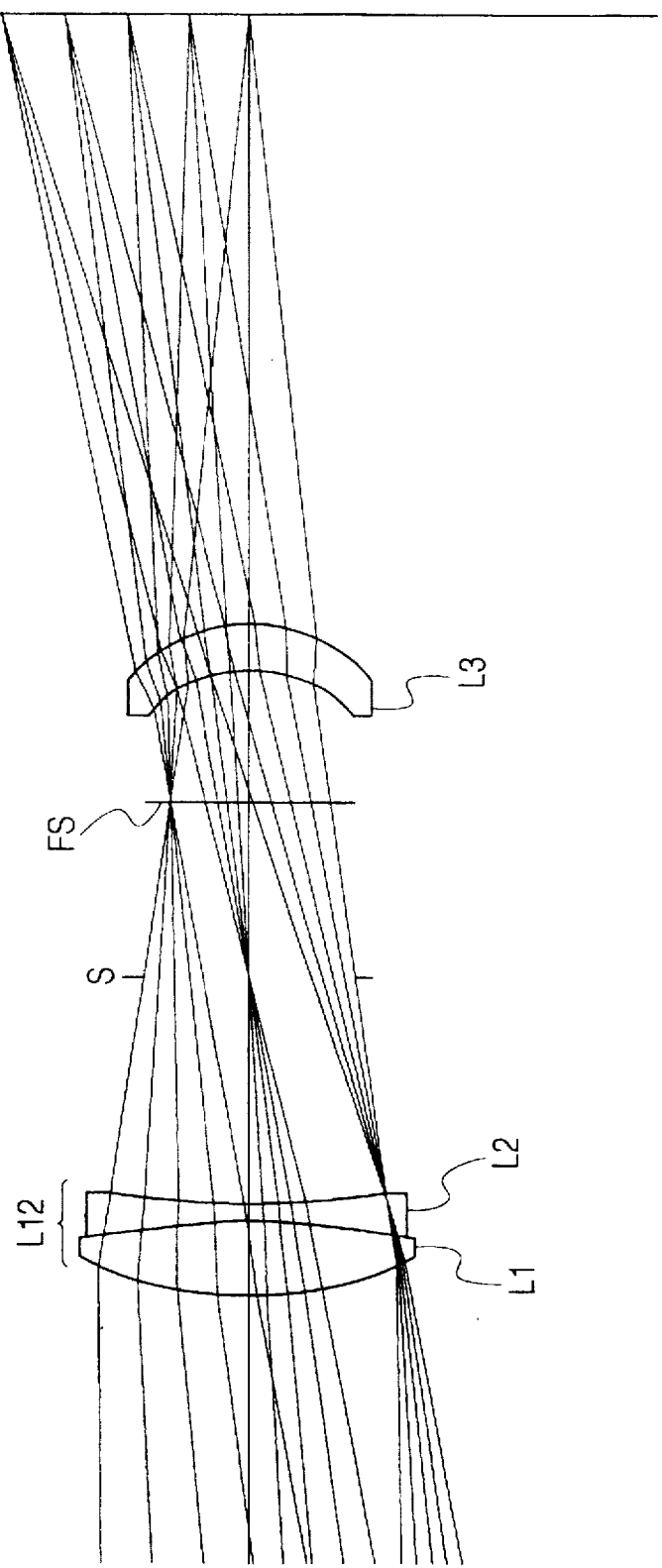
FIG. 13 is a diagram showing the lens arrangement of a telephoto lens according to a seventh embodiment of the present invention.

FIG. 13 is a diagram showing the lens arrangement of a telephoto lens according to the seventh embodiment of the present invention.

The telephoto lens shown in FIG. 13 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 7 shows numerical data of the seventh embodiment of the present invention. In Table 7, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

TABLE 7 f = 100.000
Bf = 44.216
FN = 4.63
2ω = 20.2°
TL = 0.928

|   | r        | d       | n                | υ     |
|---|----------|---------|------------------|-------|
| 1 | 28.7942  | 5.3333  | 1.74443          | 49.52 |
| 2 | −53.8486 | 1.1667  | 1.80384          | 33.89 |
| 3 | 59.2046  | 16.6667 |                  |       |
| 4 | ∞        | 12.5000 | (aperture stop S)|       |
| 5 | ∞        | 9.7500  | (fixed stop FS)  |       |
| 6 | −10.0787 | 3.1667  | 1.62280          | 57.03 |
| 7 | −11.8790 | 44.2160 |                  |       |

(Condition Corresponding Values)

| (1) r1/f =                         | 0.288  |
| (2) r4/f =                         | −0.101 |
| (3) (r4 − r5)/d4 =                 | 0.568  |
| (4) d3/f =                         | 0.389  |
| (5) n2 − n1 =                      | 0.059  |
| (6) r3/{f · (n2 − n1)$^{1/2}$} =   | 2.426  |
| (7) n2 − 23/υ2 − n1 + 40/υ1 =      | 0.188  |
| (8) υ3 =                           | 57.0   |

TABLE 8 f = 100.000
Bf = 38.121
FN = 4.72
2ω = 20.3°
TL = 0.915

|   | r        | d       | n                | υ     |
|---|----------|---------|------------------|-------|
| 1 | 27.7178  | 4.6667  | 1.59319          | 67.87 |
| 2 | −91.8439 | 1.1667  | 1.90265          | 35.72 |
| 3 | 187.5850 | 16.6667 |                  |       |
| 4 | ∞        | 12.5000 | (aperture stop S)|       |
| 5 | ∞        | 11.6667 | (fixed stop FS)  |       |
| 6 | −11.3670 | 6.6667  | 1.56384          | 60.69 |
| 7 | −15.1061 | 38.1213 |                  |       |

(Condition Corresponding Values)

| (1) r1/f =                         | 0.277  |
| (2) r4/f =                         | −0.114 |
| (3) (r4 − r5)/d4 =                 | 0.561  |
| (4) d3/f =                         | 0.408  |
| (5) n2 − n1 =                      | 0.310  |
| (6) r3/{f · (n2 − n1)$^{1/2}$} =   | 3.372  |
| (7) n2 − 23/υ2 − n1 + 40/υ1 =      | 0.255  |
| (8) υ3 =                           | 60.7   |

FIGS. 14A to 14E are graphs showing various aberrations in the seventh embodiment.

In these graphs, FNO is the F-number, Y is the image height, ω is the half field angle, D is the d-line (λ=587.6 nm), and G is the g-line (λ=435.8 nm).

Figure 14:
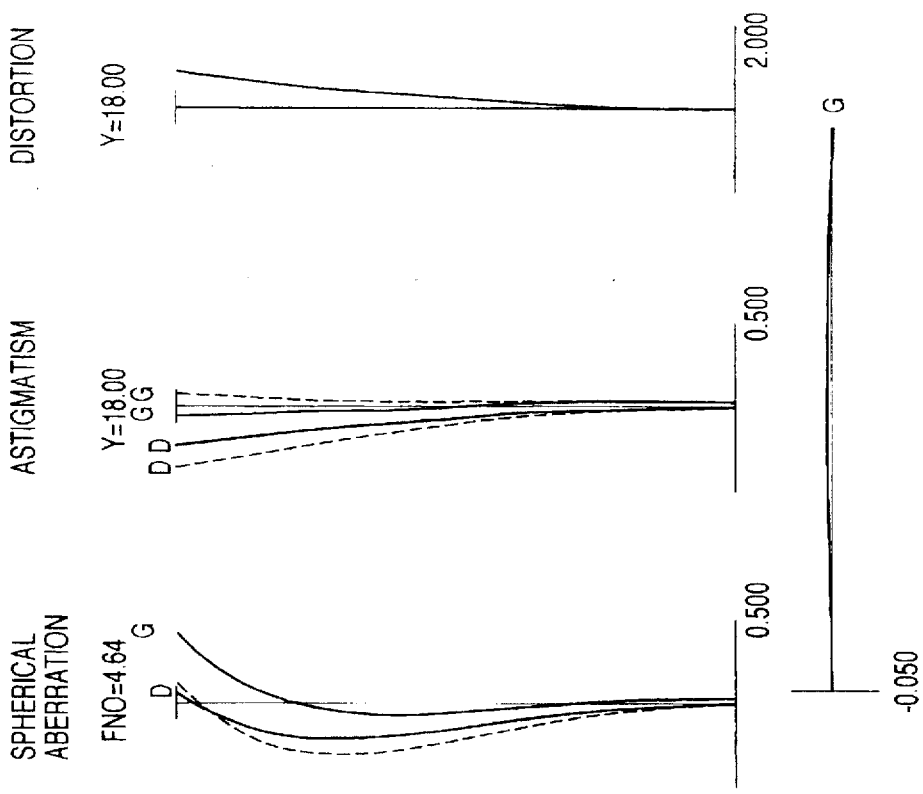
FIGS. 14A to 14E are graphs showing various aberrations in the seventh embodiment of the present invention.

In FIG. 14B showing an astigmatism, a solid curve represents the sagittal image plane, and a broken curve represents the meridional image plane. In addition, in FIG. 14A showing a spherical aberration, a broken curve represents the sine condition.

As can be seen from these graphs, in this embodiment, various aberrations are satisfactorily corrected.

[Eighth Embodiment]

Figure 15:
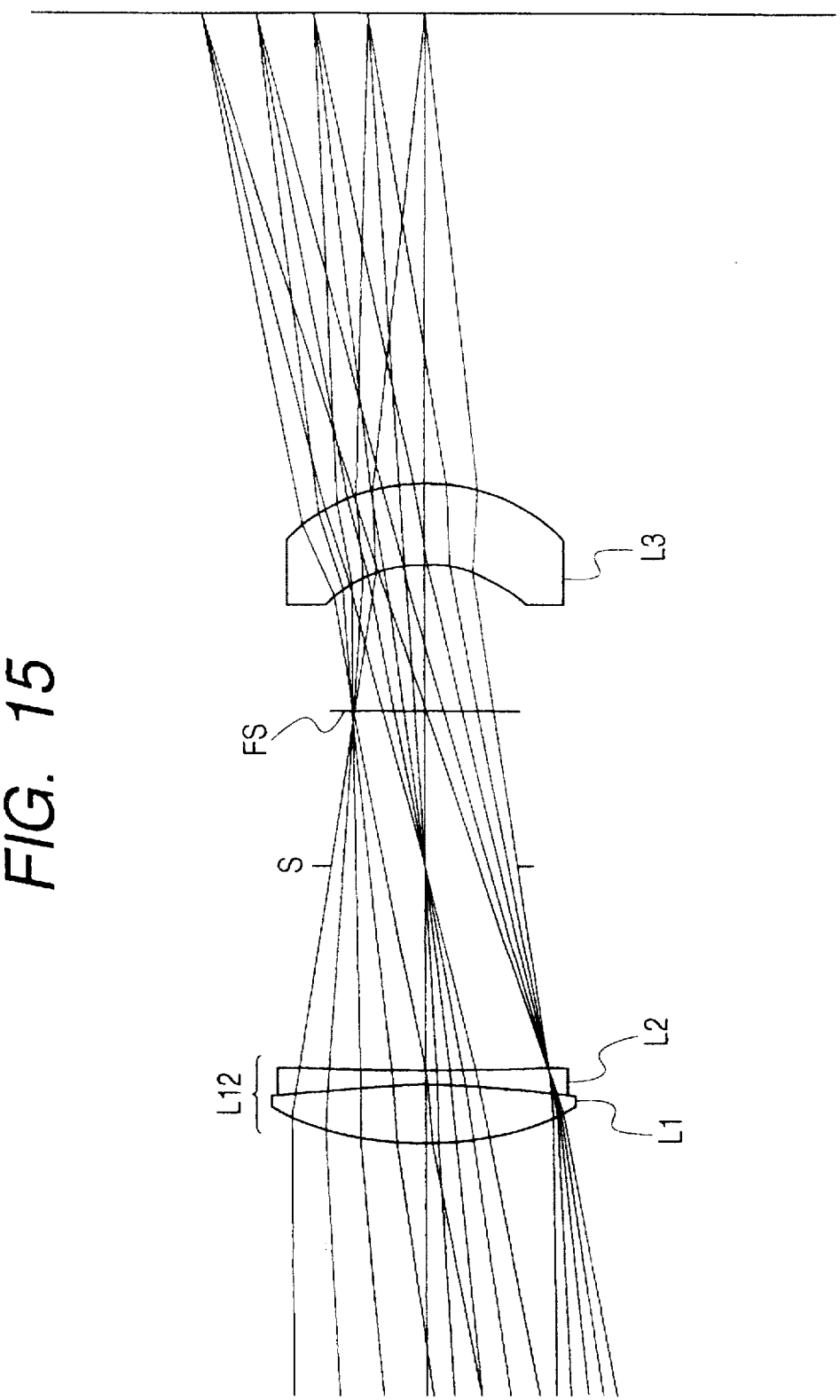
FIG. 15 is a diagram showing the lens arrangement of a telephoto lens according to an eighth embodiment of the present invention.

FIG. 15 is a diagram showing the lens arrangement of a telephoto lens according to the eighth embodiment of the present invention.

The telephoto lens shown in FIG. 15 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 8 shows numerical data of the eighth embodiment of the present invention. In Table 8, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and v are the refractive index and Abbe number for the d-line (λ=587.6 nm).

FIGS. 16A to 16E are graphs showing various aberrations in the eighth embodiment.

In these graphs, FNO is the F-number, Y is the image height, ω is the half field angle, D is the d-line (λ=587.6 nm), and G is the g-line (λ=435.8 nm).

In FIG. 16B showing an astigmatism, a solid curve represents the sagittal image plane, and a broken curve represents the meridional image plane. In addition, in FIG. 16A showing a spherical aberration, a broken curve represents the sine condition.

As can be seen from these graphs, in this embodiment, various aberrations are satisfactorily corrected.

[Ninth Embodiment]

FIG. 17 is a diagram showing the lens arrangement of a telephoto lens according to the ninth embodiment of the present invention.

The telephoto lens shown in FIG. 17 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 9 shows numerical data of the ninth embodiment of the present invention. In Table 9, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and v are the refractive index and Abbe number for the d-line (λ=587.6 nm).

TABLE 9

| | f = 100.000 | | |
|---|---|---|---|
| | Bf = 43.736 | | |
| | FN = 4.64 | | |
| | 2ω = 20.2° | | |
| | TL = 0.920 | | |

| | r | d | n | ν |
|---|---|---|---|---|
| 1 | 24.4495 | 5.3333 | 1.53172 | 48.97 |
| 2 | −79.7678 | 1.1667 | 1.80518 | 25.35 |
| 3 | 162.9677 | 16.6667 | | |
| 4 | ∞ | 12.5000 | (aperture stop S) | |
| 5 | ∞ | 6.5833 | (fixed stop FS) | |
| 6 | −10.7757 | 6.0000 | 1.56384 | 60.69 |
| 7 | −14.2219 | 43.7360 | | |

(Condition Corresponding Values)

| | |
|---|---|
| (1) r1/f = | 0.244 |
| (2) r4/f = | −0.108 |
| (3) (r4 − r5)/d4 = | 0.574 |
| (4) d3/f = | 0.358 |
| (5) n2 − n1 = | 0.274 |
| (6) r3/{f · (n2 − n1)$^{1/2}$} = | 3.116 |
| (7) n2 − 23/ν2 − n1 + 40/ν1 = | 0.183 |
| (8) ν3 = | 60.7 |

TABLE 10

| | f = 100.000 | | |
|---|---|---|---|
| | Bf = 43.827 | | |
| | FN = 4.60 | | |
| | 2ω = 20.3° | | |
| | TL = 0.925 | | |

| | r | d | n | ν |
|---|---|---|---|---|
| 1 | 26.9405 | 5.3333 | 1.66755 | 41.96 |
| 2 | −80.5484 | 1.1667 | 1.80518 | 25.35 |
| 3 | 71.5165 | 16.6667 | | |
| 4 | ∞ | 12.5000 | (aperture stop S) | |
| 5 | ∞ | 8.8333 | (fixed stop FS) | |
| 6 | −10.0548 | 4.1667 | 1.56384 | 60.69 |
| 7 | −12.3156 | 43.8271 | | |

(Condition Corresponding Values)

| | |
|---|---|
| (1) r1/f = | 0.269 |
| (2) r4/f = | −0.101 |
| (3) (r4 − r5)/d4 = | 0.543 |
| (4) d3/f = | 0.380 |
| (5) n2 − n1 = | 0.138 |
| (6) r3/{f · (n2 − n1)$^{1/2}$} = | 1.928 |
| (7) n2 − 23/ν2 − n1 + 40/ν1 = | 0.184 |
| (8) ν3 = | 60.7 |

FIGS. 18A to 18E are graphs showing various aberrations in the ninth embodiment.

In these graphs, FNO is the F-number, Y is the image height, ω is the half field angle, D is the d-line (λ=587.6 nm), and G is the g-line (λ=435.8 nm).

In FIG. 18B showing an astigmatism, a solid curve represents the sagittal image plane, and a broken curve represents the meridional image plane. In addition, in FIG. 18A showing a spherical aberration, a broken curve represents the sine condition.

As can be seen from these graphs, in this embodiment, various aberrations are satisfactorily corrected.

[Tenth Embodiment]

Figure 19:
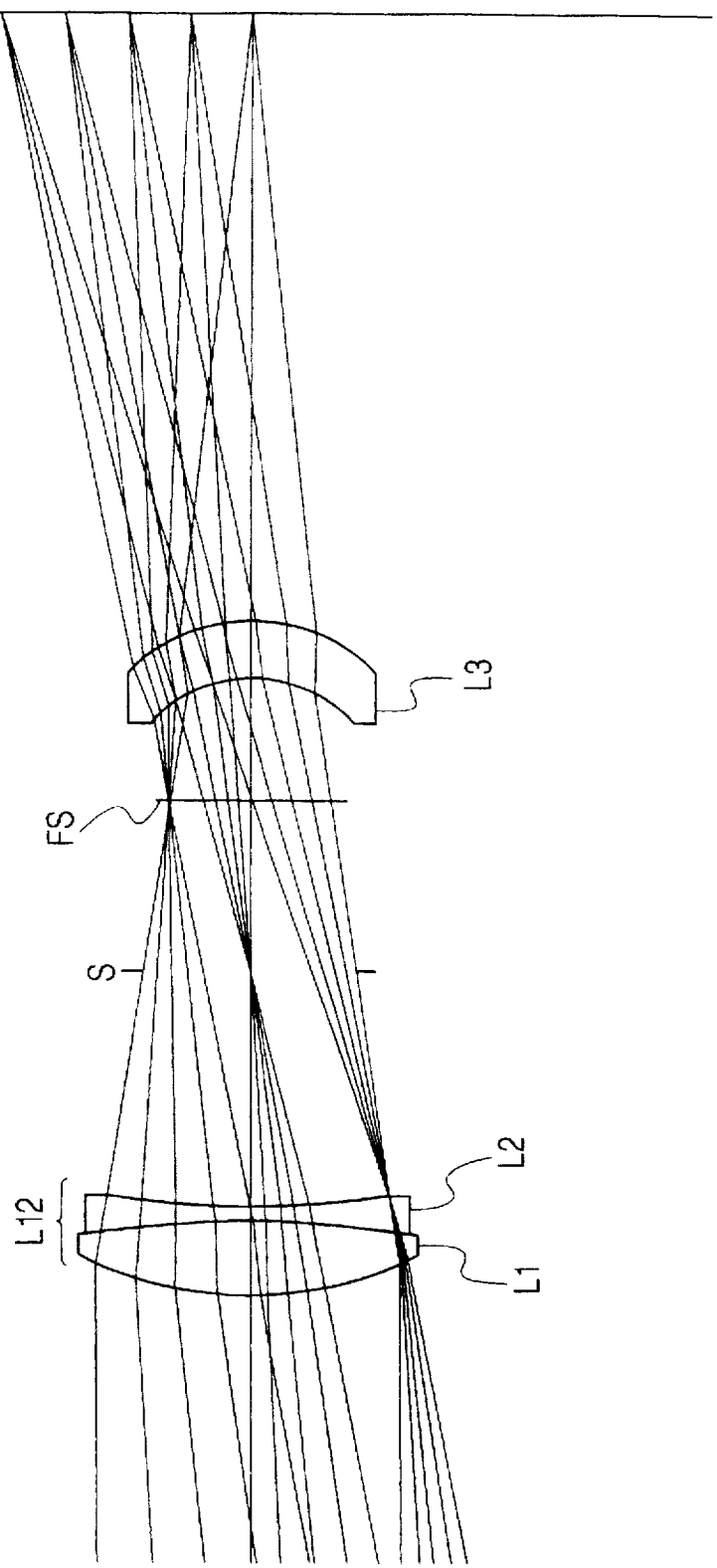
FIG. 19 is a diagram showing the lens arrangement of a telephoto lens according to a tenth embodiment of the present invention.

FIG. 19 is a diagram showing the lens arrangement of a telephoto lens according to the tenth embodiment of the present invention.

The telephoto lens shown in FIG. 19 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 10 shows numerical data of the tenth embodiment of the present invention. In Table 10, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

FIGS. 20A to 20E are graphs showing various aberrations in the tenth embodiment.

In these graphs, FNO is the F-number, Y is the image height, ω is the half field angle, D is the d-line (λ=587.6 nm), and G is the g-line (λ=435.8 nm).

In FIG. 20B showing an astigmatism, a solid curve represents the sagittal image plane, and a broken curve represents the meridional image plane. In addition, in FIG. 20A showing a spherical aberration, a broken curve represents the sine condition.

As can be seen from these graphs, in this embodiment, various aberrations are satisfactorily corrected.

[Eleventh Embodiment]

Figure 21:
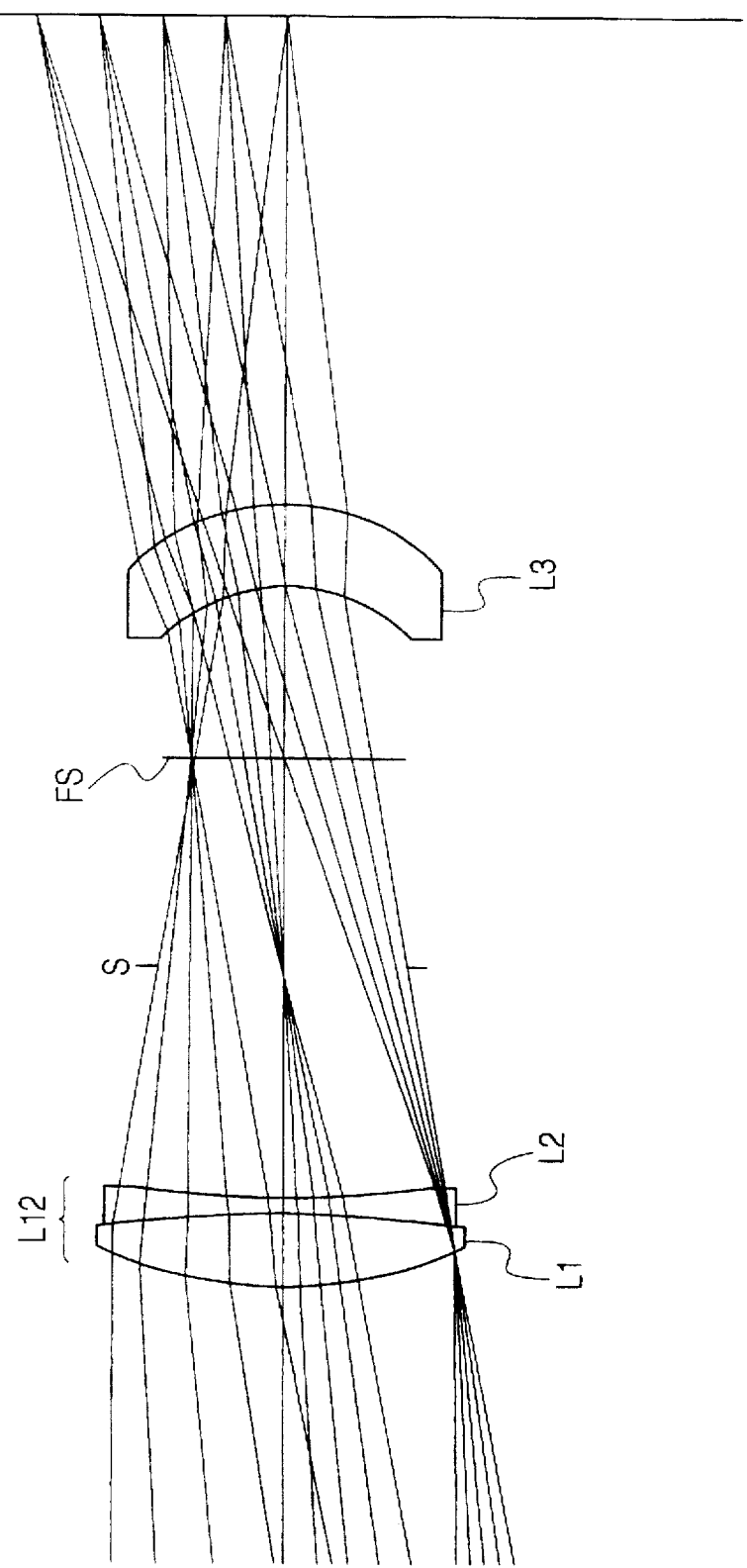
FIG. 21 is a diagram showing the lens arrangement of a telephoto lens according to an eleventh embodiment of the present invention.

FIG. 21 is a diagram showing the lens arrangement of a telephoto lens according to the eleventh embodiment of the present invention.

The telephoto lens shown in FIG. 21 comprises, in the following order from the object side, a positive cemented lens L12 composed of a biconvex lens L1 and a biconcave lens L2, and a negative meniscus lens L3 with the convex side facing the image side.

An aperture stop S is arranged between the positive cemented lens L12 and the negative meniscus lens L3.

A fixed stop FS for effectively limiting the upper-side light beam is arranged between the aperture stop S and the negative meniscus lens L3. With the function of the fixed stop FS, a harmful flare light component is shielded from the central field angle to the peripheral field angle. Therefore, an improvement in performance at the periphery can be expected.

Table 11 shows numerical data of the eleventh embodiment of the present invention. In Table 11, f is the focal length of the entire system, FN is the F-number, 2ω is the field angle, Bf is the back focus, and TL is the tele-ratio.

In addition, the number at the left end represents the order of lens surfaces from the object side, r represents the radii of curvature of the respective lens surfaces, d is the surface-to-surface distance, and n and ν are the refractive index and Abbe number for the d-line (λ=587.6 nm).

TABLE 11

```
f = 100.000
Bf = 35.437
FN = 4.08
2ω = 20.2°
TL = 0.918
```

| | r | d | n | ν |
|---|---|---|---|---|
| 1 | 31.1855 | 5.3333 | 1.65160 | 58.50 |
| 2 | −71.4649 | 1.1667 | 1.80384 | 33.89 |
| 3 | 127.8512 | 16.6667 | | |
| 4 | ∞ | 15.0000 | (aperture stop S) | |
| 5 | ∞ | 12.5000 | (fixed stop FS) | |
| 6 | −11.8530 | 5.6667 | 1.58913 | 61.09 |
| 7 | −15.1113 | 35.4372 | | |

(Condition Corresponding Values)

| | |
|---|---|
| (1) r1/f = | 0.312 |
| (2) r4/f = | −0.118 |
| (3) (r4 − r5)/d4 = | 0.575 |
| (4) d3/f = | 0.442 |
| (5) n2 − n1 = | 0.152 |
| (6) r3/{f · (n2 − n1)$^{1/2}$} = | 3.277 |
| (7) n2 − 23/ν2 − n1 + 40/ν1 = | 0.157 |
| (8) ν3 = | 61.1 |

FIGS. 22A to 22E are graphs showing various aberrations in the eleventh embodiment.

In these graphs, FNO is the F-number, Y is the image height, ω is the half field angle, D is the d-line (λ=587.6 nm), and G is the g-line (λ=435.8 nm).

In FIG. 22B showing an astigmatism, a solid curve represents the sagittal image plane, and a broken curve represents the meridional image plane. In addition, in FIG. 22A showing a spherical aberration, a broken curve represents the sine condition.

As can be seen from these graphs, in this embodiment, various aberrations are satisfactorily corrected.

As has been described above, according to the present invention, an inexpensive and compact telephoto lens with a two-group three-lens structure, for which various aberrations are satisfactorily corrected, can be realized.

In addition, although the telephoto lens of the present invention is a lens system of a telephoto type having a tele-ratio of 1 or less, the variation in aberration caused due to the camera-to-subject distance is minimized by optimizing the lens arrangement. Therefore, this telephoto lens is suitable as a so-called macro lens.

What is claimed is:

1. A telephoto lens comprising, in the following order from the object side:

a positive cemented lens component including a biconvex lens and a biconcave lens and having a meniscus shape as a whole with the convex side facing the object side; and a negative meniscus lens component with the convex side facing the image side, wherein said telephoto lens satisfies the following condition:

$0.51 < (r4-r5)/d4 < 0.7$ where r4: the radius of curvature of an object-side surface of said negative meniscus lens component r5: the radius of curvature of an image-side surface of said negative meniscus lens component d4: the on-axis thickness of said negative meniscus lens component.

2. A telephoto lens according to claim 1, further satisfying the following conditions:

$0.23 < r1/f < 0.33$ $-0.13 < r4/f < -0.09$ where r1: the radius of curvature of an object-side surface of said biconvex lens f: the focal length of an entire lens system in an infinite in-focus state.

3. A telephoto lens according to claim 2, further satisfying the following conditions:

$0.32 < d3/f < 0.45$ $0.05 < n2-n1$ $1.8 < r3/\{f \cdot (n2-n1)^{1/2}\} < 3.5$ $0.145 < n2 - 23/\nu2 - n1 + 40/\nu1 < 0.27$ $50 < \nu3$ where d3: the on-axis air gap between said positive cemented lens component having the meniscus shape and said negative meniscus lens component n1: the refractive index for a d-line of said biconvex lens n2: the refractive index for the d-line of said biconcave lens r3: the radius of curvature of an image-side surface of said biconcave lens ν1: the Abbe number of said biconvex lens ν2: the Abbe number of said biconcave lens ν3: the Abbe number of said negative meniscus lens component.

4. A telephoto lens comprising, in the following order from the object side:

a positive cemented lens component including a biconvex lens and a biconcave lens and having a meniscus shape as a whole with the convex side facing the object side; and a negative meniscus lens component with the convex side facing the image side, wherein said telephoto lens satisfies the following conditions:

$0.05 < n2-n1$ $0.145 < n2 - 23/\nu2 - n1 + 40/\nu1 < 0.27$ where n1: the refractive index for a d-line of said biconvex lens n2: the refractive index for the d-line of said biconcave lens ν1: the Abbe number of said biconvex lens ν2: the Abbe number of said biconcave lens.

5. A telephoto lens according to claim 4, further satisfying the following condition:

$0.51 < (r4-r5)/d4 < 0.7$ where r4: the radius of curvature of an object-side surface of said negative meniscus lens component r5: the radius of curvature of an image-side surface of said negative meniscus lens component d4: the on-axis thickness of said negative meniscus lens component.

6. A telephoto lens according to claim 5, further satisfying the following conditions:

$$0.23 < r1/f < 0.33$$

$$-0.13 < r4/f < -0.09$$

where r1: the radius of curvature of an object-side surface of said biconvex lens f: the focal length of an entire lens system in an infinite in-focus state.

7. A telephoto lens according to claim 4, further satisfying the following conditions:

$$0.23 < r1/f < 0.33$$

$$-0.13 < r4/f < -0.09$$

where r1: the radius of curvature of an object-side surface of said biconvex lens r4: the radius of curvature of said object-side surface of said negative meniscus lens component f: the focal length of an entire lens system in an infinite in-focus state.

8. A telephoto lens according to claim 4, wherein further satisfying the following conditions:

$$0.32 < d3/f < 0.45$$

$$1.8 < r3/\{f \cdot (n2-n1)^{1/2}\} < 3.5$$

where d3: the on-axis air gap between said positive cemented lens component L12 having the meniscus shape and said negative meniscus lens component f: the focal length of an entire lens system in an infinite in-focus state r3: the radius of curvature of an image-side surface of said biconcave lens.

9. A telephoto lens according to claim 5, further satisfying the following conditions:

$$0.32 < d3/f < 0.45$$

$$1.8 < r3/\{f \cdot (n2-n1)^{1/2}\} < 3.5$$

where d3: the on-axis air gap between the positive cemented lens component having the meniscus shape and the negative meniscus lens component f: the focal length of an entire lens system in an infinite in-focus state r3: the radius of curvature of an image-side surface of said biconcave lens.

* * * * *